US010575017B2

(12) United States Patent
Gamei et al.

(10) Patent No.: US 10,575,017 B2
(45) Date of Patent: Feb. 25, 2020

(54) DATA ENCODING AND DECODING BASED ON TRANSFORM-SKIP MODE DETECTION

(71) Applicant: SONY CORPORATION, Tokyo (JP)

(72) Inventors: James Alexander Gamei, Surrey (GB); Karl James Sharman, Newbury (GB)

(73) Assignee: SONY CORPORATION, Tokyo (JP)

(*) Notice: Subject to any disclaimer, the term of this patent is extended or adjusted under 35 U.S.C. 154(b) by 138 days.

(21) Appl. No.: 15/021,191

(22) PCT Filed: Sep. 24, 2014

(86) PCT No.: PCT/GB2014/052902
§ 371 (c)(1),
(2) Date: Mar. 10, 2016

(87) PCT Pub. No.: WO2015/044660
PCT Pub. Date: Apr. 2, 2015

(65) Prior Publication Data
US 2016/0227252 A1    Aug. 4, 2016

(30) Foreign Application Priority Data

Sep. 25, 2013 (GB) .................................. 1317041.0

(51) Int. Cl.
H04N 19/176    (2014.01)
H04N 19/159    (2014.01)
(Continued)

(52) U.S. Cl.
CPC ......... H04N 19/625 (2014.11); H04N 19/103 (2014.11); H04N 19/122 (2014.11);
(Continued)

(58) Field of Classification Search
CPC .... H04N 19/625; H04N 19/44; H04N 19/126; H04N 19/103; H04N 19/122;
(Continued)

(56) References Cited

U.S. PATENT DOCUMENTS

2013/0051457 A1    2/2013 Joshi et al.
2014/0056362 A1    2/2014 Mrak et al.
(Continued)

FOREIGN PATENT DOCUMENTS

EP         2 879 377 A1    6/2015
WO    WO 2013/001279 A2    1/2013
(Continued)

OTHER PUBLICATIONS

David Flynn, et al., "Transform Skipping in the presence of Scaling Lists", JCTVC-J0092, Jul. 2012, 6 pages.
(Continued)

Primary Examiner — Susan E. Hodges
(74) Attorney, Agent, or Firm — Oblon, McClelland, Maier & Neustadt, L.L.P.

(57) ABSTRACT

A video data decoding apparatus in which if a detector detects a transform-skip mode is not applicable to an array of encoded video data values, the detector controls a dequantizer to apply dequantization parameters which may vary between data values in the array of encoded data values according to a position of each data value within the array, and controls an inverse frequency transformer to apply an inverse frequency transform to the dequantized data values; and if the detector detects the transform-skip mode is applicable to the array of encoded video data values, the detector controls the dequantizer to apply dequantization parameters which, for each array of encoded data values, are independent of the position of each data value within the array, and controls the inverse frequency transformer not to apply an inverse frequency transform to the dequantized data values.

21 Claims, 13 Drawing Sheets

(51) Int. Cl.
*H04N 19/625* (2014.01)
*H04N 19/126* (2014.01)
*H04N 19/18* (2014.01)
*H04N 19/103* (2014.01)
*H04N 19/122* (2014.01)
*H04N 19/129* (2014.01)
*H04N 19/13* (2014.01)
*H04N 19/44* (2014.01)

(52) U.S. Cl.
CPC ......... *H04N 19/126* (2014.11); *H04N 19/129* (2014.11); *H04N 19/13* (2014.11); *H04N 19/159* (2014.11); *H04N 19/18* (2014.11); *H04N 19/44* (2014.11)

(58) Field of Classification Search
CPC .... H04N 19/159; H04N 19/18; H04N 19/129; H04N 19/13
USPC .......................................................... 375/240
See application file for complete search history.

(56) References Cited

U.S. PATENT DOCUMENTS

| | | | | |
|---|---|---|---|---|
| 2014/0086311 A1* | 3/2014 | Lou | ........................ | H04N 19/30 375/240.03 |
| 2014/0269915 A1* | 9/2014 | Lee | ..................... | H04N 19/124 375/240.12 |
| 2015/0189289 A1* | 7/2015 | Kim | ..................... | H04N 19/167 375/240.02 |

FOREIGN PATENT DOCUMENTS

WO 2014 002895 A1 1/2014
WO 2014 002897 A1 1/2014

OTHER PUBLICATIONS

Andrea Gabriellini, et al., "Transform Skipping for Inter Predicted Coding Units", JCTVC-J0077_r1, Jul. 2012, 8 pages.
Hui Yong Kim, et al., "Mental cross-check of JCTVC-J0184 on transform skip", JCTVC-J0535, Jul. 2012, 2 pages.
Hui Yong Kim, et al., "QM Bypass for Transform Skip Mode", JCTVC-J0201_r1, Jul. 2012, 5 pages.
Yoshitaka Morigami, et al., "On Transform Skip", JCTVC-J0184, Jul. 2012, 11 pages.
International Search Report dated Nov. 28, 2014, in PCT/GB2014/052902 Filed Sep. 24, 2014.
Office Action dated Jun. 19, 2018 in Japanese Patent Application No. 2016-517463 (submitting English language translation only), 3 pages.
Peng, X. et al. "Non-RCE2: Transform skip on large TUs", Microsoft Corp., Qualcomm Incorporated, Joint Collaborative Team on Video Coding (JCT-VC) of ITU-T SG 16 WP 3 and ISO/IEC JTC 1/SC 29/WG 11, JCTVC-NO288_r3, 2013, pp. 1-6.
Office Action dated Nov. 18, 2019 in Indian Application No. 201617009932.

* cited by examiner

US 10,575,017 B2

DATA ENCODING AND DECODING BASED ON TRANSFORM-SKIP MODE DETECTION

CROSS REFERENCE TO RELATED APPLICATIONS

The present application claims the benefit of the earlier filing date of GB1317041.0 filed in the United Kingdom Intellectual Property Office on 25 Sep. 2013, the entire contents of which application are incorporated herein by reference.

FIELD OF THE DISCLOSURE

This disclosure relates to data encoding and decoding.

DESCRIPTION OF THE RELATED ART

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present disclosure.

There are several video data compression and decompression systems which involve transforming video data into a frequency domain representation, quantising the frequency domain coefficients and then applying some form of entropy encoding to the quantised coefficients.

The transformation into the spatial frequency domain at the encoder side corresponds to an inverse transformation at the decoder side. Example transformations include the so-called discrete cosine transformation (DCT) and the so-called discrete sine transformation (DST). In some examples the transformations are carried out by matrix-multiplying an array of input samples (derived from the video data to be coded) by a matrix of transformation coefficients to generate frequency-transformed data. Frequency-transformed data is converted back to sample data, from which output video data can be derived, by matrix-multiplying an array of the frequency-transformed data by a matrix of inverse-transformation coefficients.

Some standards and draft standards, such as the so-called High Efficiency Video Coding (HEVC) standards, define encoding and decoding modes in which a spatial frequency transformation is not in fact used. These are sometimes referred to as "transform-skip" or "trans-quant skip" ("trans-quant" being an abbreviation for "transformation and quantisation") modes.

SUMMARY

An aspect of this disclosure is defined by claim 1.
Further respective aspects and features are defined in the appended claims.

It is to be understood that both the foregoing general description and the following detailed description are exemplary, but not restrictive of, the present disclosure.

BRIEF DESCRIPTION OF THE DRAWINGS

A more complete appreciation of the disclosure and many of the attendant advantages thereof will be readily obtained as the same becomes better understood by reference to the following detailed description of embodiments, when considered in connection with the accompanying drawings, wherein.

DESCRIPTION OF THE EMBODIMENTS

Figure 1:
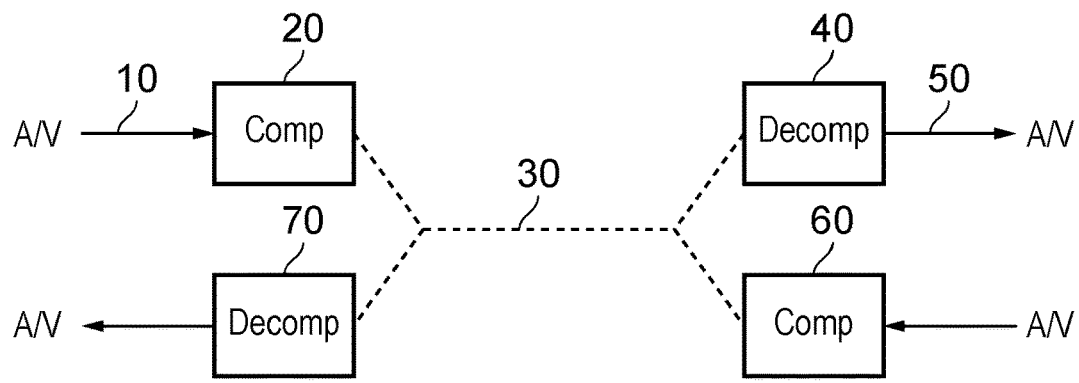
FIG. 1 schematically illustrates an audio/video (AN) data transmission and reception system using video data compression and decompression.

Referring now to the drawings, FIGS. 1-4e are provided to give schematic illustrations of apparatus or systems making use of the compression and/or decompression apparatus to be described below in connection with embodiments.

All of the data compression and/or decompression apparatus is to be described below may be implemented in hardware, in software running on a general-purpose data processing apparatus such as a general-purpose computer, as programmable hardware such as an application specific integrated circuit (ASIC) or field programmable gate array (FPGA) or as combinations of these. In cases where the embodiments are implemented by software and/or firmware, it will be appreciated that such software and/or firmware, and non-transitory machine-readable data storage media by which such software and/or firmware are stored or otherwise provided, are considered as embodiments.

FIG. 1 schematically illustrates an audio/video data transmission and reception system using video data compression and decompression.

An input audio/video signal 10 is supplied to a video data compression apparatus 20 which compresses at least the video component of the audio/video signal 10 for transmission along a transmission route 30 such as a cable, an optical fibre, a wireless link or the like. The compressed signal is processed by a decompression apparatus 40 to provide an output audio/video signal 50. For the return path, a compression apparatus 60 compresses an audio/video signal for transmission along the transmission route 30 to a decompression apparatus 70.

The compression apparatus 20 and decompression apparatus 70 can therefore form one node of a transmission link. The decompression apparatus 40 and decompression apparatus 60 can form another node of the transmission link. Of course, in instances where the transmission link is uni-directional, only one of the nodes would require a compression apparatus and the other node would only require a decompression apparatus.

Figure 2:
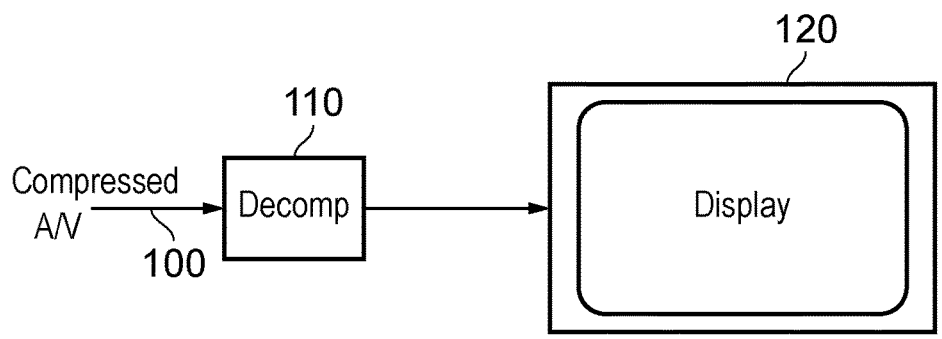
FIG. 2 schematically illustrates a video display system using video data decompression.

FIG. 2 schematically illustrates a video display system using video data decompression. In particular, a compressed audio/video signal 100 is processed by a decompression apparatus 110 to provide a decompressed signal which can be displayed on a display 120. The decompression apparatus 110 could be implemented as an integral part of the display 120, for example being provided within the same casing as the display device. Alternatively, the decompression apparatus 110 might be provided as (for example) a so-called set top box (STB), noting that the expression "set-top" does not imply a requirement for the box to be sited in any particular orientation or position with respect to the display 120; it is simply a term used in the art to indicate a device which is connectable to a display as a peripheral device.

Figure 3:
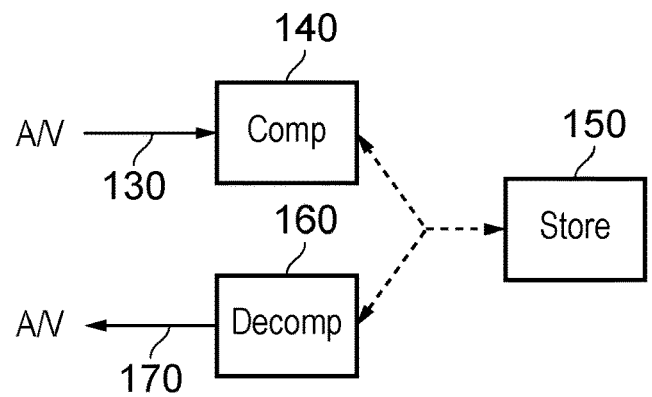
FIG. 3 schematically illustrates an audio/video storage system using video data compression and decompression.

FIG. 3 schematically illustrates an audio/video storage system using video data compression and decompression. An input audio/video signal 130 is supplied to a compression apparatus 140 which generates a compressed signal for storing by a store device 150 such as a magnetic disk device, an optical disk device, a magnetic tape device, a solid state storage device such as a semiconductor memory or other storage device. For replay, compressed data is read from the store device 150 and passed to a decompression apparatus 160 for decompression to provide an output audio/video signal 170.

It will be appreciated that the compressed or encoded signal, and a storage medium or data carrier storing that signal, are considered as embodiments. Reference is made to FIGS. 4d and 4e described below.

Figure 4A:
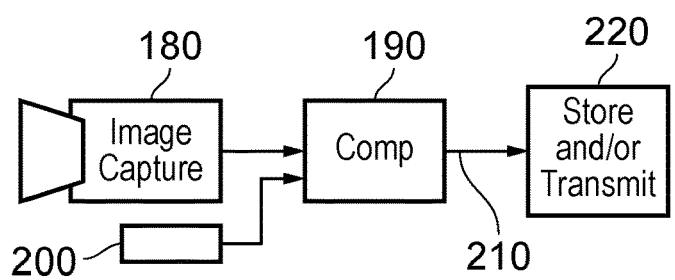
FIG. 4a schematically illustrates a video camera using video data compression.

FIG. 4a schematically illustrates a video camera using video data compression. In FIG. 4a, and image capture device 180, such as a charge coupled device (CCD) image sensor and associated control and read-out electronics, generates a video signal which is passed to a compression apparatus 190. A microphone (or plural microphones) 200 generates an audio signal to be passed to the compression apparatus 190. The compression apparatus 190 generates a compressed audio/video signal 210 to be stored and/or transmitted (shown generically as a schematic stage 220).

The techniques to be described below relate primarily to video data compression. It will be appreciated that many existing techniques may be used for audio data compression in conjunction with the video data compression techniques which will be described, to generate a compressed audio/video signal. Accordingly, a separate discussion of audio data compression will not be provided. It will also be appreciated that the data rate associated with video data, in particular broadcast quality video data, is generally very much higher than the data rate associated with audio data (whether compressed or uncompressed). It will therefore be appreciated that uncompressed audio data could accompany compressed video data to form a compressed audio/video signal. It will further be appreciated that although the present examples (shown in FIGS. 1-4e) relate to audio/video data, the techniques to be described below can find use in a system which simply deals with (that is to say, compresses, decompresses, stores, displays and/or transmits) video data. That is to say, the embodiments can apply to video data compression without necessarily having any associated audio data handling at all.

Figure 4B:
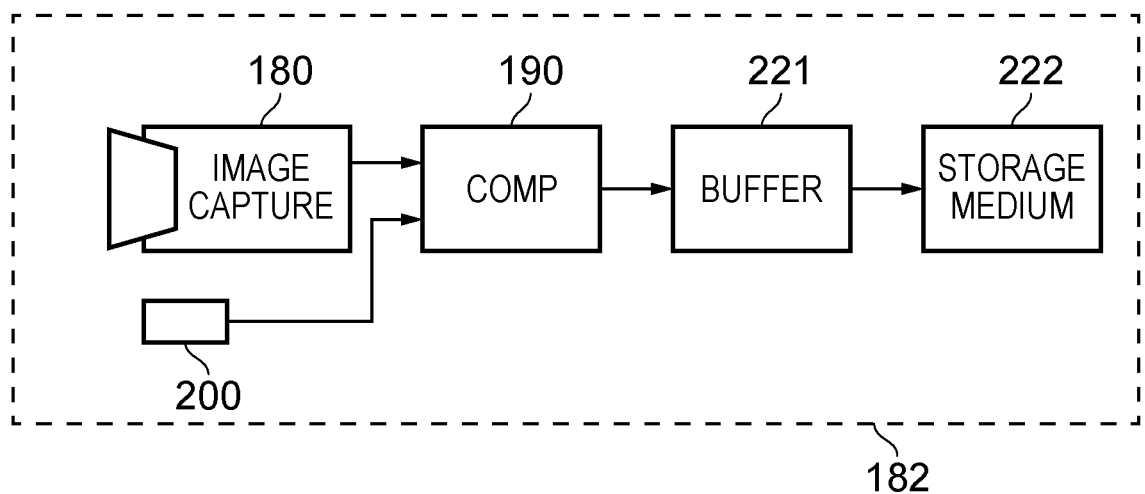
FIG. 4b schematically illustrates an example video camera in more detail.

FIG. 4b schematically illustrates an example video camera apparatus 183 in more detail. Those features numbered in common with FIG. 4a will not be described further. FIG. 4b is an example of the camera of FIG. 4a (in the case that the unit 220 of FIG. 4a provides a storage capability) in which the compressed data are first buffered by a buffer 221 and then stored in a storage medium 222 such as a magnetic disk, an optical disk, flash memory, a so-called solid-state disk drive (SSD) or the like. Note that the arrangement of FIG. 4b can be implemented as a single (physical) unit 182.

Figure 4C:
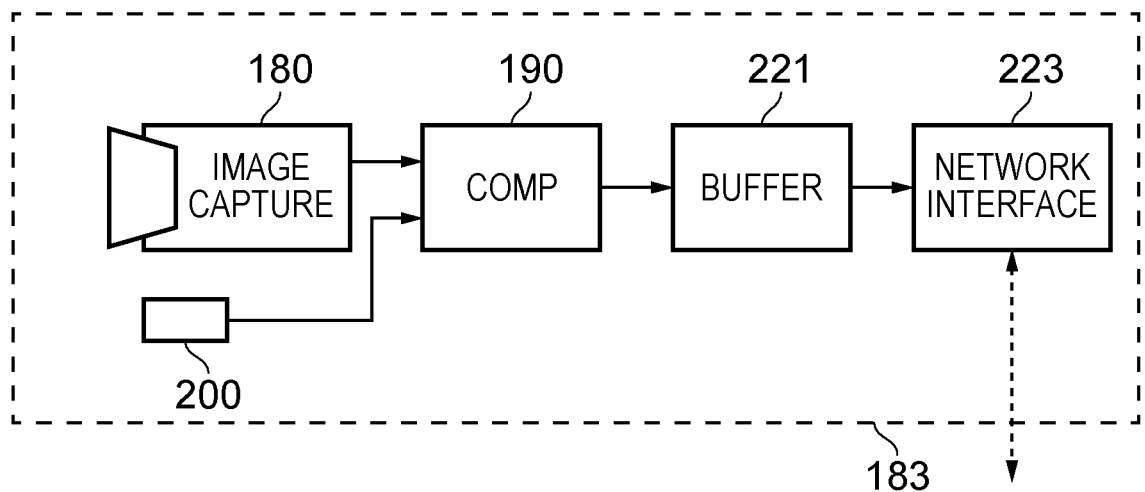
FIG. 4c schematically illustrates another example video camera.
Figure 4D:
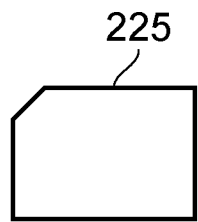
FIGS. 4d and 4e schematically illustrate data carriers.
Figure 4E:
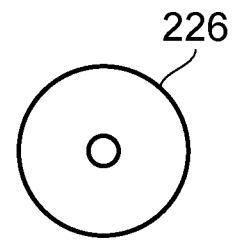

FIG. 4c schematically illustrates another example video camera in which, in place of the storage arrangement of FIG. 4b, a network interface 223 is provided in order to allow the compressed data to be transmitted to another unit (not shown). The network interface 223 can also allow for incoming data to be received by the video camera, such as control data. Note that the arrangement of FIG. 4b can be implemented as a single (physical) unit 183.

FIGS. 4d and 4e schematically illustrate data carriers, for example for use as the storage medium 222 and carrying compressed data which has been compressed according to the compression techniques described in the present application. FIG. 4d shows a schematic example of a removable non-volatile storage medium 225 implemented as solid state memory such as flash memory. FIG. 4e shows a schematic example of a removable non-volatile storage medium 226 implemented as a disk medium such as an optical disk.

Figure 5:
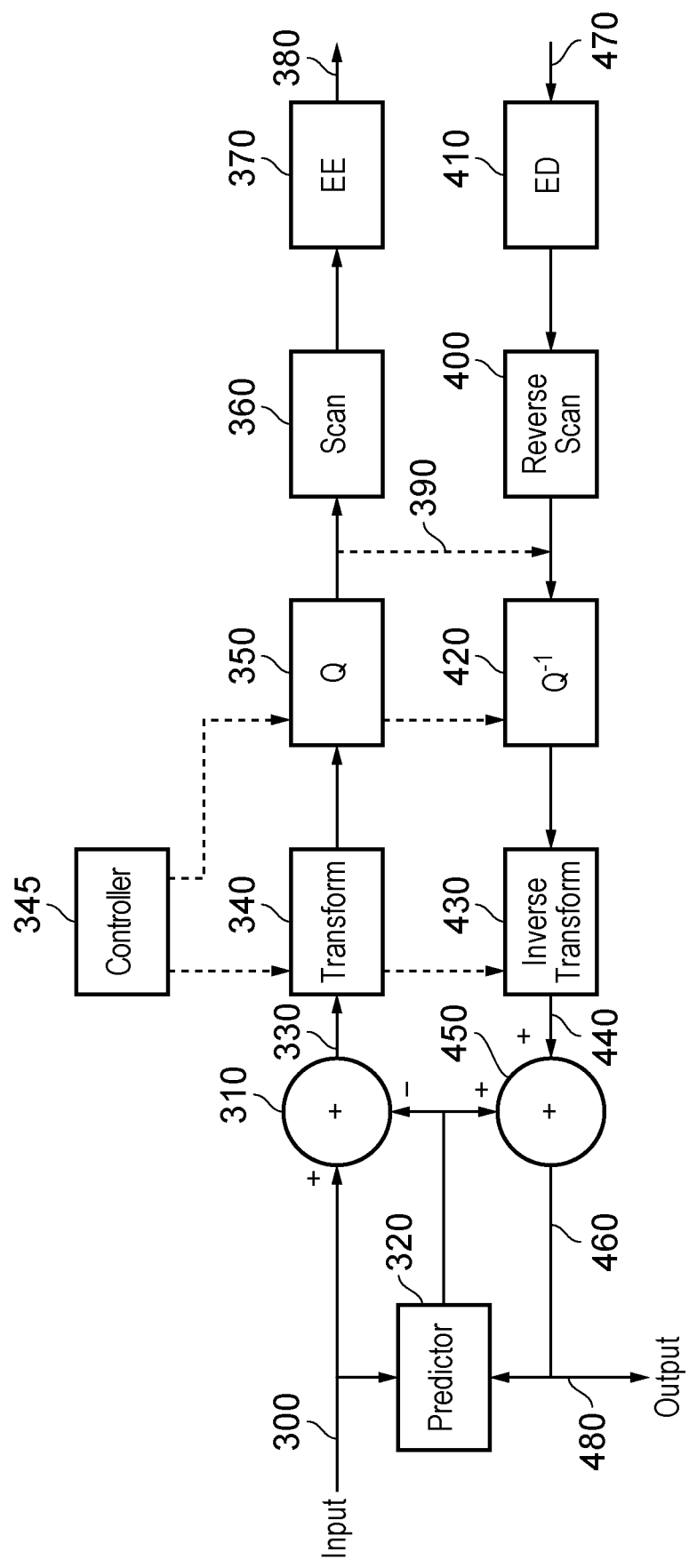
FIG. 5 provides a schematic overview of a video data compression and decompression apparatus.

FIG. 5 provides a schematic overview of a video data compression and decompression apparatus.

Successive images of an input video signal 300 are supplied to an adder 310 and to an image predictor 320. The image predictor 320 will be described below in more detail with reference to FIG. 6. The adder 310 in fact performs a subtraction (negative addition) operation, in that it receives the input video signal 300 on a "+" input and the output of the image predictor 320 on a "−" input, so that the predicted image is subtracted from the input image. The result is to generate a so-called residual image signal 330 representing the difference between the actual and projected images.

One reason why a residual image signal is generated is as follows. The data coding techniques to be described, that is to say the techniques which will be applied to the residual image signal, tends to work more efficiently when there is less "energy" in the image to be encoded. Here, the term "efficiently" refers to the generation of a small amount of encoded data; for a particular image quality level, it is desirable (and considered "efficient") to generate as little data as is practicably possible. The reference to "energy" in the residual image relates to the amount of information contained in the residual image. If the predicted image were to be identical to the real image, the difference between the two (that is to say, the residual image) would contain zero information (zero energy) and would be very easy to encode into a small amount of encoded data. In general, if the prediction process can be made to work reasonably well, the expectation is that the residual image data will contain less information (less energy) than the input image and so will be easier to encode into a small amount of encoded data.

The residual image data 330 is supplied to a transform unit 340 which generates a discrete cosine transform (DCT) representation of the residual image data. The DCT technique itself is well known and will not be described in detail here. There are however aspects of the techniques used in the present apparatus which will be described in more detail below.

Note that in some embodiments, a discrete sine transform (DST) is used instead of a DCT. In other embodiments, no transform might be used. This can be done selectively, so that the transform stage is, in effect, bypassed, for example under the control of a "transform-skip" command or mode.

The output of the transform unit 340, which is to say, a set of transform coefficients for each transformed block of image data, is supplied to a quantiser 350. Various quantisation techniques are known in the field of video data compression, ranging from a simple multiplication by a quantisation scaling factor through to the application of complicated lookup tables under the control of a quantisation parameter. The general aim is twofold. Firstly, the quantisation process reduces the number of possible values of the transformed data. Secondly, the quantisation process can increase the likelihood that values of the transformed data are zero. Both of these can make the entropy encoding process work more efficiently in generating small amounts of compressed video data.

A controller 345 controls the operation of the transform unit 340 and the quantiser 350 (and their respective inverse units), according to techniques to be discussed further below. Note that the controller 345 may also control other aspects of the operation of the apparatus of FIG. 5.

A data scanning process is applied by a scan unit 360. The purpose of the scanning process is to reorder the quantised transformed data so as to gather as many as possible of the non-zero quantised transformed coefficients together, and of course therefore to gather as many as possible of the zero-valued coefficients together. These features can allow so-called run-length coding or similar techniques to be applied efficiently. So, the scanning process involves selecting coefficients from the quantised transformed data, and in particular from a block of coefficients corresponding to a block of image data which has been transformed and quantised, according to a "scanning order" so that (a) all of the coefficients are selected once as part of the scan, and (b) the scan tends to provide the desired reordering. One example scanning order which can tend to give useful results is a so-called zigzag scanning order. The scanned coefficients are then passed to an entropy encoder (EE) 370. Again, various types of entropy encoding may be used. Two examples are variants of the so-called CABAC (Context Adaptive Binary Arithmetic Coding) system and variants of the so-called CAVLC (Context Adaptive Variable-Length Coding) system. In general terms, CABAC is considered to provide a better efficiency, and in some studies has been shown to provide a 10-20% reduction in the quantity of encoded output data for a comparable image quality compared to CAVLC. However, CAVLC is considered to represent a much lower level of complexity (in terms of its implementation) than CABAC.

Note that the scanning process and the entropy encoding process are shown as separate processes, but in fact can be combined or treated together. That is to say, the reading of data into (or processing of data by) the entropy encoder can take place in the scan order. Corresponding considerations apply to the respective inverse processes.

The output of the entropy encoder 370, along with additional data, for example defining the manner in which the predictor 320 generated the predicted image, provides a compressed output video signal 380.

However, a return path is also provided because the operation of the predictor 320 itself depends upon a decompressed version of the compressed output data.

The reason for this feature is as follows. At the appropriate stage in the decompression process a decompressed version of the residual data is generated. This decompressed residual data has to be added to a predicted image to generate an output image (because the original residual data was the difference between the input image and a predicted image). In order that this process is comparable, as between the compression side and the decompression side, the predicted images generated by the predictor 320 should be the same during the compression process and during the decompression process. Of course, at decompression, the apparatus does not have access to the original input images, but only to the decompressed images. Therefore, at compression, the predictor 320 bases its prediction (at least, for inter-image encoding) on decompressed versions of the compressed images.

The entropy encoding process carried out by the entropy encoder 370 is considered to be "lossless", which is to say that it can be reversed to arrive at exactly the same data which was first supplied to the entropy encoder 370. So, the return path can be implemented before the entropy encoding stage. Indeed, the scanning process carried out by the scan unit 360 is also considered lossless, but in the present embodiment the return path 390 is from the output of the quantiser 350 to the input of a complimentary inverse quantiser 420.

In general terms, an entropy decoder 410, the reverse scan unit 400, an inverse quantiser 420 and an inverse transform unit 430 provide the respective inverse functions of the entropy encoder 370, the scan unit 360, the quantiser 350 and the transform unit 340. For now, the discussion will continue through the compression process; the process to decompress an input compressed video signal corresponds to the return path of the compression process and so a decoding apparatus or method corresponds to the features or operation of the decoding path of the encoder described here.

In the compression process, the scanned coefficients are passed by the return path 390 from the quantiser 350 to the inverse quantiser 420 which carries out the inverse operation of the scan unit 360. An inverse quantisation and inverse transformation process are carried out by the units 420, 430 to generate a compressed-decompressed residual image signal 440.

The image signal 440 is added, at an adder 450, to the output of the predictor 320 to generate a reconstructed output image 460. This forms one input to the image predictor 320.

Turning now to the process applied to a received compressed video signal 470, the signal is supplied to the entropy decoder 410 and from there to the chain of the reverse scan unit 400, the inverse quantiser 420 and the inverse transform unit 430 before being added to the output of the image predictor 320 by the adder 450. In straightforward terms, the output 460 of the adder 450 forms the output decompressed video signal 480. In practice, further filtering may be applied before the signal is output.

Accordingly, FIG. 5 provides an example of video data decoding apparatus operable to decode an array of encoded video data values, the apparatus comprising: a dequantiser configured to dequantise the array of encoded video data values by applying a dequantisation parameter to each data value so as to generate corresponding dequantised data values; and an inverse frequency transformer configured to apply an inverse frequency transform to the dequantised data values. FIG. 5 also provides an example of video data encoding apparatus operable to encode an array of input video data values in a transform-skip mode and optionally a non transform-skip mode (discussed further below), the apparatus comprising: a frequency transformer configured to apply a frequency transform to the input video data values to generate an array of frequency transformed input data values; and a quantiser configured to quantise the frequency transformed input data values by applying a quantisation parameter to each frequency transformed input data value so as to generate corresponding quantised data values.

Note that the term "optionally" is used to indicate that the apparatus may be operable in a transform-skip mode and a non-transform-skip mode, with the selection being made on a block by block (such as TU-by-TU) or other basis, or may be an apparatus which is not operable in the non-transform-skip mode.

Figure 6:
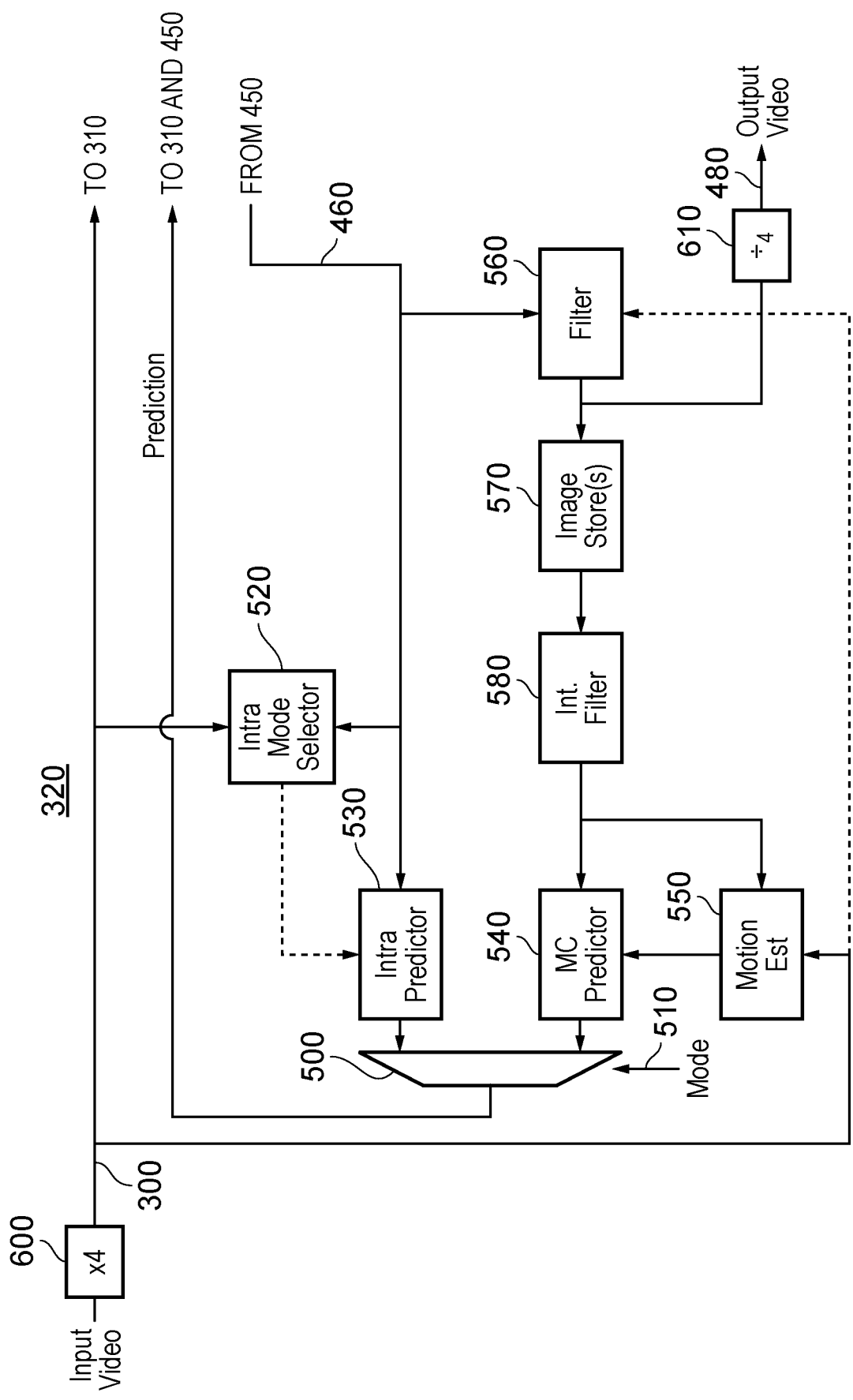
FIG. 6 schematically illustrates the generation of predicted images.

FIG. 6 schematically illustrates the generation of predicted images, and in particular the operation of the image predictor 320.

There are two basic modes of prediction: so-called intra-image prediction and so-called inter-image, or motion-compensated (MC), prediction.

Intra-image prediction bases a prediction of the content of a block of the image on data from within the same image. This corresponds to so-called I-frame encoding in other video compression techniques. In contrast to I-frame encoding, where the whole image is intra-encoded, in the present embodiments the choice between intra- and inter-encoding can be made on a block-by-block basis, though in other embodiments the choice is still made on an image-by-image basis.

Motion-compensated prediction makes use of motion information which attempts to define the source, in another adjacent or nearby image, of image detail to be encoded in the current image. Accordingly, in an ideal example, the contents of a block of image data in the predicted image can be encoded very simply as a reference (a motion vector) pointing to a corresponding block at the same or a slightly different position in an adjacent image.

Returning to FIG. 6, two image prediction arrangements (corresponding to intra- and inter-image prediction) are shown, the results of which are selected by a multiplexer 500 under the control of a mode signal 510 so as to provide blocks of the predicted image for supply to the adders 310 and 450. The choice is made in dependence upon which selection gives the lowest "energy" (which, as discussed above, may be considered as information content requiring encoding), and the choice is signalled to the encoder within the encoded output data stream. Image energy, in this context, can be detected, for example, by carrying out a trial subtraction of an area of the two versions of the predicted image from the input image, squaring each pixel value of the difference image, summing the squared values, and identifying which of the two versions gives rise to the lower mean squared value of the difference image relating to that image area.

The actual prediction, in the intra-encoding system, is made on the basis of image blocks received as part of the signal 460, which is to say, the prediction is based upon encoded-decoded image blocks in order that exactly the same prediction can be made at a decompression apparatus. However, data can be derived from the input video signal 300 by an intra-mode selector 520 to control the operation of the intra-image predictor 530.

For inter-image prediction, a motion compensated (MC) predictor 540 uses motion information such as motion vectors derived by a motion estimator 550 from the input video signal 300. Those motion vectors are applied to a processed version of the reconstructed image 460 by the motion compensated predictor 540 to generate blocks of the inter-image prediction.

The processing applied to the signal 460 will now be described. Firstly, the signal is filtered by a filter unit 560. This involves applying a "deblocking" filter to remove or at least tend to reduce the effects of the block-based processing carried out by the transform unit 340 and subsequent operations. Also, an adaptive loop filter is applied using coefficients derived by processing the reconstructed signal 460 and the input video signal 300. The adaptive loop filter is a type of filter which, using known techniques, applies adaptive filter coefficients to the data to be filtered. That is to say, the filter coefficients can vary in dependence upon various factors. Data defining which filter coefficients to use is included as part of the encoded output data stream.

The filtered output from the filter unit 560 in fact forms the output video signal 480. It is also buffered in one or more image stores 570; the storage of successive images is a requirement of motion compensated prediction processing, and in particular the generation of motion vectors. To save on storage requirements, the stored images in the image stores 570 may be held in a compressed form and then decompressed for use in generating motion vectors. For this particular purpose, any known compression/decompression system may be used. The stored images are passed to an interpolation filter 580 which generates a higher resolution version of the stored images; in this example, intermediate samples (sub-samples) are generated such that the resolution of the interpolated image is output by the interpolation filter 580 is 8 times (in each dimension) that of the images stored in the image stores 570. The interpolated images are passed as an input to the motion estimator 550 and also to the motion compensated predictor 540.

In embodiments, a further optional stage is provided, which is to multiply the data values of the input video signal by a factor of four using a multiplier 600 (effectively just shifting the data values left by two bits), and to apply a corresponding divide operation (shift right by two bits) at the output of the apparatus using a divider or right-shifter 610. So, the shifting left and shifting right changes the data purely for the internal operation of the apparatus. This measure can provide for higher calculation accuracy within the apparatus, as the effect of any data rounding errors is reduced.

Figure 7:
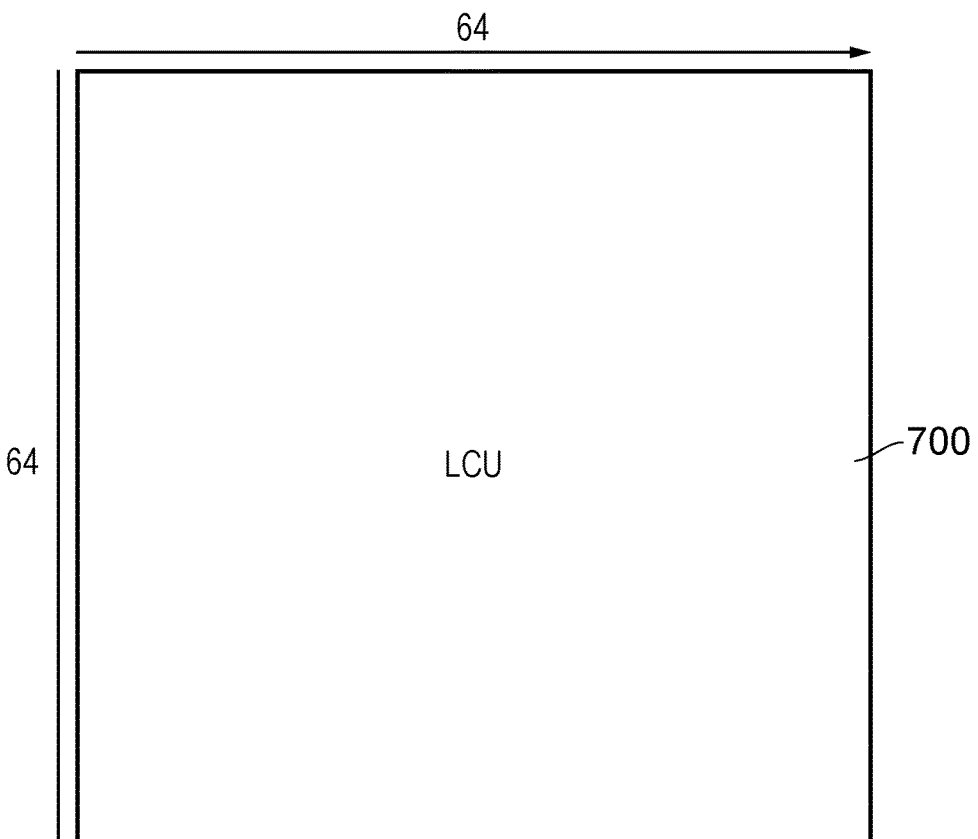
FIG. 7 schematically illustrates a largest coding unit (LCU)

The way in which an image is partitioned for compression processing will now be described. At a basic level, and image to be compressed is considered as an array of blocks of samples. For the purposes of the present discussion, the largest such block under consideration is a so-called largest coding unit (LCU) 700 (FIG. 7), which represents a square array of 64×64 samples. Here, the discussion relates to luminance samples. Depending on the chrominance mode, such as 4:4:4, 4:2:2, 4:2:0 or 4:4:4:4 (GBR plus key data), there will be differing numbers of corresponding chrominance samples corresponding to the luminance block.

Three basic types of blocks will be described: coding units, prediction units and transform units. In general terms, the recursive subdividing of the LCUs allows an input picture to be partitioned in such a way that both the block sizes and the block coding parameters (such as prediction or residual coding modes) can be set according to the specific characteristics of the image to be encoded.

Figure 8:
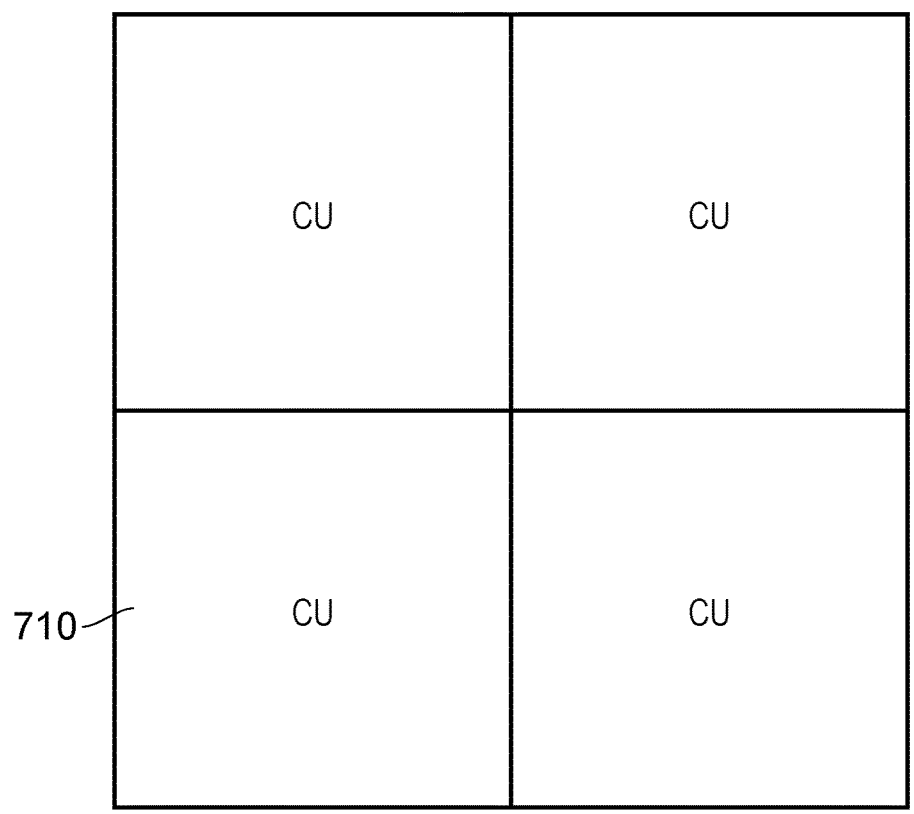
FIG. 8 schematically illustrates a set of four coding units (CU)
Figure 9:
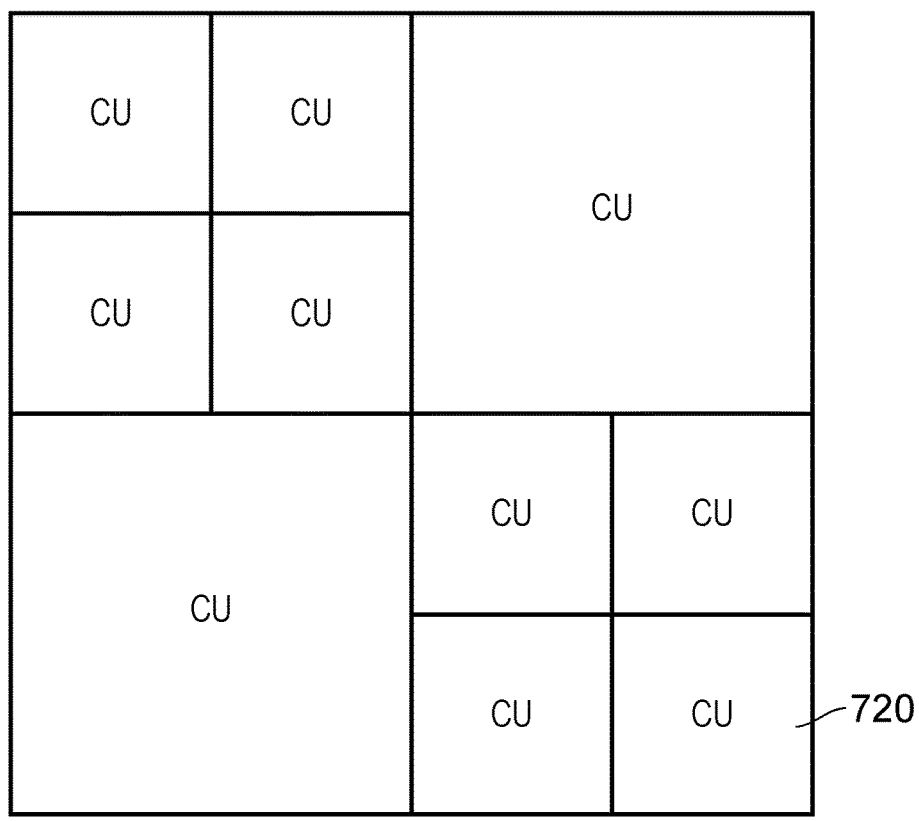
FIGS. 9 and 10 schematically illustrate the coding units of FIG. 8 sub-divided into smaller coding units.
Figure 10:
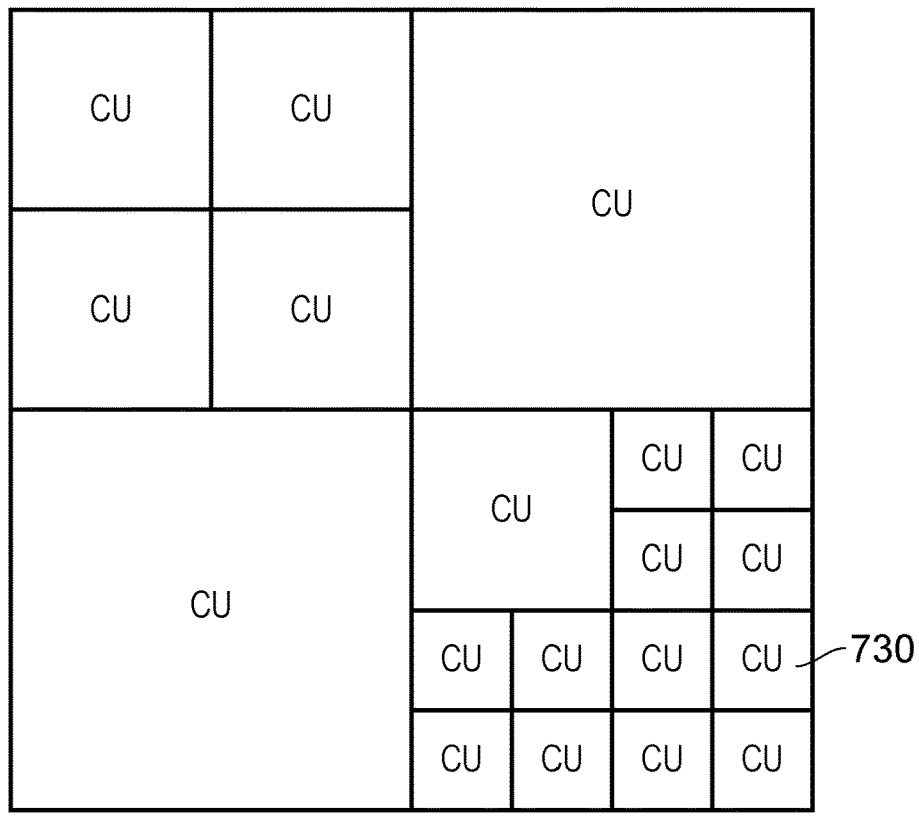

The LCU may be subdivided into so-called coding units (CU). Coding units are always square and have a size between 8×8 samples and the full size of the LCU 700. The coding units can be arranged as a kind of tree structure, so that a first subdivision may take place as shown in FIG. 8, giving coding units 710 of 32×32 samples; subsequent subdivisions may then take place on a selective basis so as to give some coding units 720 of 16×16 samples (FIG. 9) and potentially some coding units 730 of 8×8 samples (FIG. 10). Overall, this process can provide a content-adapting coding tree structure of CU blocks, each of which may be as large as the LCU or as small as 8×8 samples. Encoding of the output video data takes place on the basis of the coding unit structure.

Figure 11:
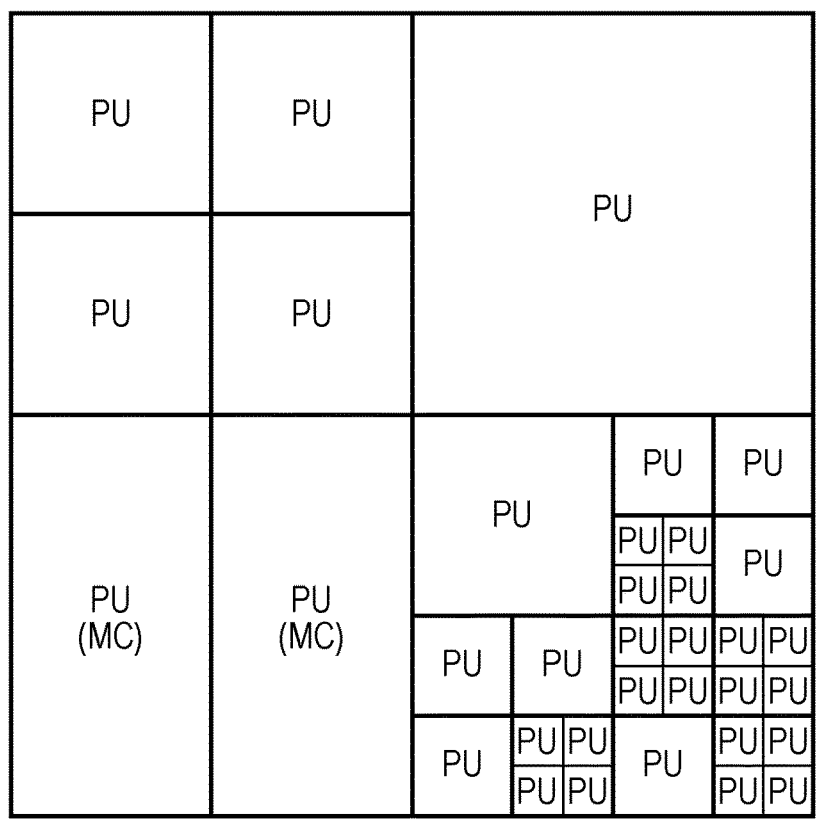
FIG. 11 schematically illustrates an array of prediction units (PU)

FIG. 11 schematically illustrates an array of prediction units (PU). A prediction unit is a basic unit for carrying information relating to the image prediction processes, or in other words the additional data added to the entropy encoded residual image data to form the output video signal from the apparatus of FIG. 5. In general, prediction units are not restricted to being square in shape. They can take other shapes, in particular rectangular shapes forming half of one of the square coding units, as long as the coding unit is greater than the minimum (8×8) size. The aim is to allow the boundary of adjacent prediction units to match (as closely as possible) the boundary of real objects in the picture, so that different prediction parameters can be applied to different real objects. Each coding unit may contain one or more prediction units.

Figure 12:
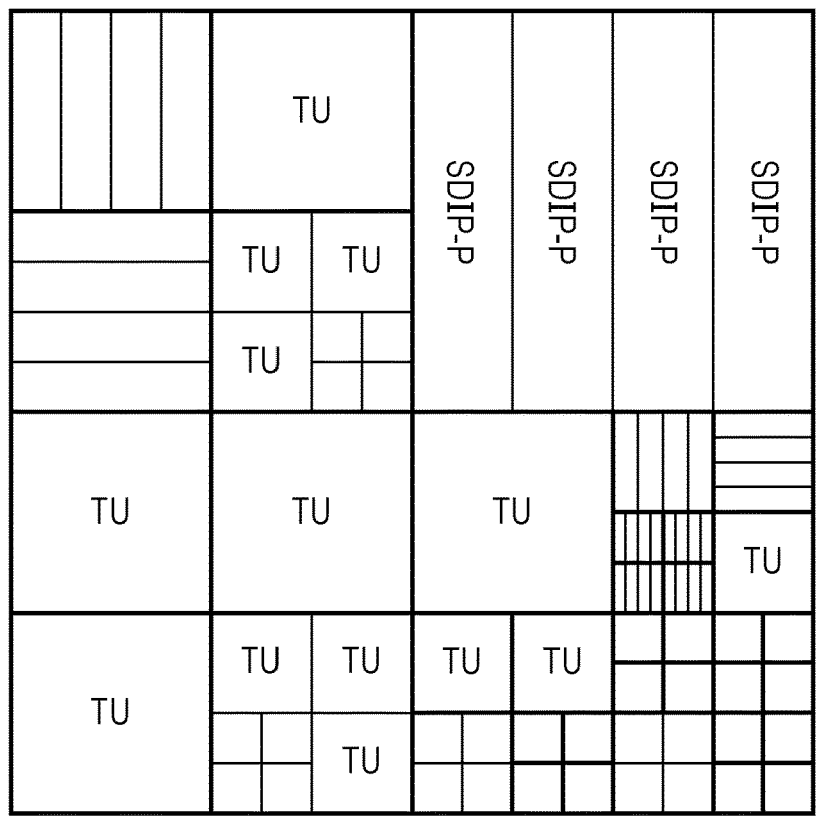
FIG. 12 schematically illustrates an array of transform units (TU)

FIG. 12 schematically illustrates an array of transform units (TU). A transform unit is a basic unit of the transform and quantisation process. Transform units are always square and can take a size from 4×4 up to 32×32 samples. Each coding unit can contain one or more transform units. The acronym SDIP-P in FIG. 12 signifies a so-called short distance intra-prediction partition. In this arrangement only one dimensional transforms are used, so a 4×N block is passed through N transforms with input data to the transforms being based upon the previously decoded neighbouring blocks and the previously decoded neighbouring lines within the current SDIP-P.

In the arrangements discussed above, quantisation is applied to the frequency separated coefficients, for example as a division of the coefficient magnitudes (the coefficient signs being preserved separately) in a transform unit (TU) by a quantisation divisor qStep derived from a quantisation parameter applicable to that block, Qp, according to:

$$qStep = baseQStep[Qp \% 6] << int(Qp/6)$$

Here, the percentage sign % indicates a modulo function, so that A % B is equal to the remainder when A is divided by B. The << sign indicates a left bit-shift by the value given after the << sign, so that, for example, <<3 represents a left shift by three bit positions. The variable baseQStep is a function of an index, varying between 0 and 5, represented by Qp % 6. So, a (potentially) different value of baseQStep applies according to the relevant index Qp % 6. The function int indicates an integer value.

For ease of calculation, the reciprocal of baseQStep is pre-calculated in some embodiments of an encoder, and left-shifted by a number of bits such as 14 bits, to give values of inverseQStep which are then multiplied by the coefficient magnitudes. A reason for this is that multiplication operations are more straightforward to implement in some arrangements than division operations.

This gives a combined operation as follows:

$$output = ((input \times inverseQStep) + rounding) << qBits$$

where $qBits = 14 + int(Qp/6) + transformShift$

Here, transformShift represents a compensation for any additional shifting imposed by the transform process.

In some embodiments, so-called scaling lists are used as a mechanism to further vary the degree of quantisation applicable to different coefficients in the TU. Each coefficient position is associated with a corresponding entry in the scaling list. The scaling list value is used to alter the quantisation divisor. In some embodiments, a scaling list value of decimal 16 corresponds to no change, which is to say that it leaves the divisor unchanged. In some embodiments, the scaling list values are used to modify the value inverseQStep used in the equations above, so that:

$$inverseQStep = (inverseQStep << 4) / scaling\ list\ value$$

A variable "rounding" was introduced above. Before the right-shift by qBits, a value is added in order to round the final result. Rounding can be applied by a number of methods such as rounding to the nearest integer or rounding to the next higher integer.

Figure 13:
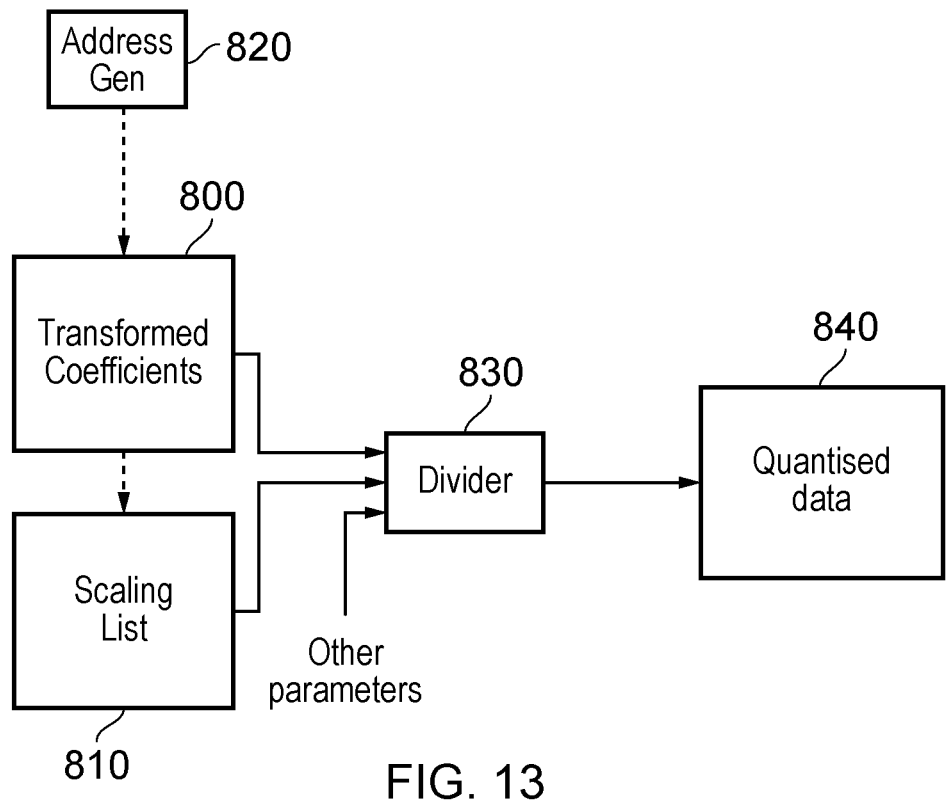
FIG. 13 schematically illustrates the use of scaling lists.

FIG. 13 schematically illustrates the use of scaling lists as discussed above. Transformed coefficients 800 are received by the quantiser 350 from the transform unit 340. An appropriate scaling list 810 (for example, selected to correspond to the block size or other parameters of the image compression) is used.

As mentioned above, there is a one-to-one correspondence between entries in the scaling list 810 and transformed coefficients. An address generator 820 provides addresses so as to look up each transformed coefficient and the corresponding scaling list entry. These are passed to a unit schematically referred to as a divider 830, along with other quantisation parameters (such as those discussed above). The divisor 830 carries out the calculation is shown above using the scaling list entries and the other parameters to generate quantised data 840. Note that the divider may in fact carry out a multiplication operation based on reciprocals of quantisation parameters, but the overall effect is the same as the division discussed above.

Figure 14:
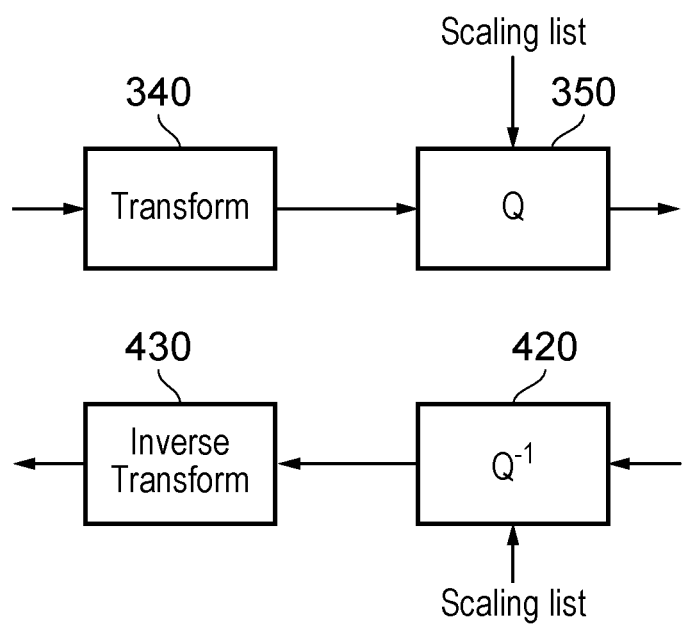
FIG. 14 schematically illustrates a part of an encoder and/or decoder.

FIG. 14 schematically illustrates a part of an encoder and/or decoder, and in particular corresponds to a portion of the arrangement shown in FIG. 5 and discussed above. Corresponding scaling lists are provided to the quantisation unit 350 and to the inverse quantisation unit 420 (which may be part of the return path of the encoder or may be part of a stand-alone decoder). At the decoding stage, the appropriate scaling list may be selected as a predetermined function of other encoding parameters or in response to data in or associated with the compressed data stream which defines the appropriate scaling list to use.

Figure 15:
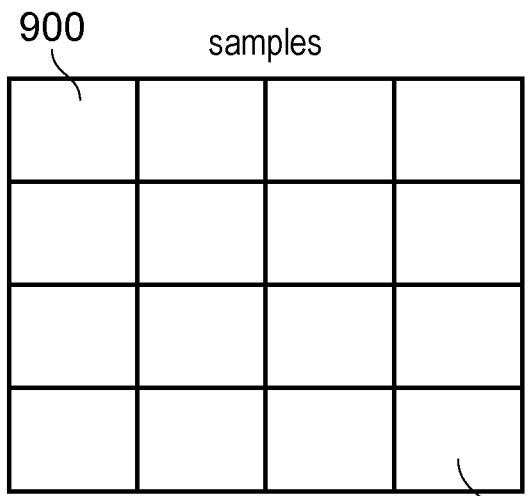
FIG. 15 schematically illustrates an array of samples.

FIG. 15 schematically illustrates an array of samples. These in fact represent samples of the residual image 330 discussed above, and are drawn at their appropriate relative spatial positions, which is to say that a sample 900 lies at the upper left corner of an array of 4×4 adjacent samples, and a sample 910 lies at the bottom right corner of such an array, with respect to positions of those samples within an image.

It will of course be appreciated that the 4×4 array of FIG. 15 is just an example; the techniques and attributes discussed here can apply to arrays of various different sizes such as 8×8, 16×16, 32×32 and so on. Indeed, although a 4×4 array is illustrated in FIGS. 15-19 primarily to make the drawings simpler and easier to understand, in some embodiments the array sizes for which the techniques to be described below are applied are 8×8, 16×16 and 32×32 only. In other words, in those embodiments, the techniques to be described below are not in fact applied to 4×4 arrays. Nevertheless, it will be appreciated that a description of a 4×4 array is used here for clarity of the explanation. Note that the array size can refer to the size of an array of encoded data values (that is, in this context, data values at the input to a dequantiser stage) or an array of frequency transformed input data values (that is, in this context, data values at the input to a quantiser stage).

Figure 16:
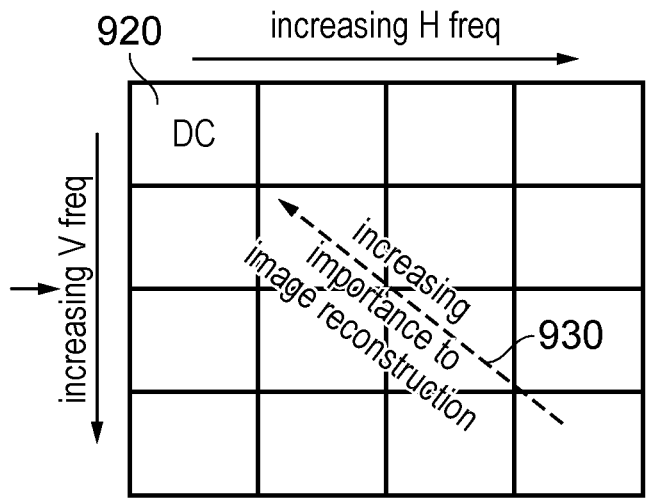
FIG. 16 schematically illustrates an array of frequency-separated coefficients.
Figure 19:
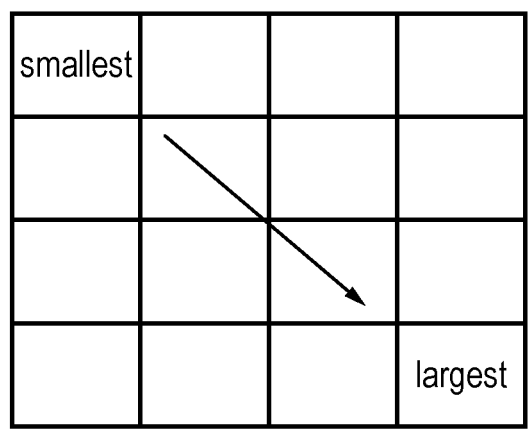
FIG. 19 schematically illustrates a trend within a scaling list.

The samples of FIG. 15 are processed by the transform unit 340 to generate frequency-separated coefficients. FIG. 16 schematically illustrates an array of such frequency-separated coefficients. Here, the position of a coefficient within the array represents the spatial frequencies corresponding to that coefficient. By convention, a so-called DC coefficient 920 occupies the upper-left array position. Moving towards the right within the array of FIG. 16 indicates an increasing horizontal frequency component, and moving towards the bottom of the array of FIG. 16 indicates an increasing vertical frequency component. Note that although it is just a convention to represent the array of coefficients in this manner (rather than, for example, having the DC coefficient in the bottom-right corner), the ordering of the coefficients is technically relevant to other parts of the process. One reason for this is schematically illustrated by a broken-line arrow 930 in FIG. 16, which indicates that moving from the bottom-right to the top-left positions within the array of FIG. 16 corresponds to a generally increasing importance of the coefficients to image reconstruction. That is to say, in order to reconstruct the array or block of samples of FIG. 15, the most important one of the coefficients of FIG. 16 is the DC coefficient 920, followed in terms of importance by the lower horizontal and vertical frequency coefficients.

Figure 17:
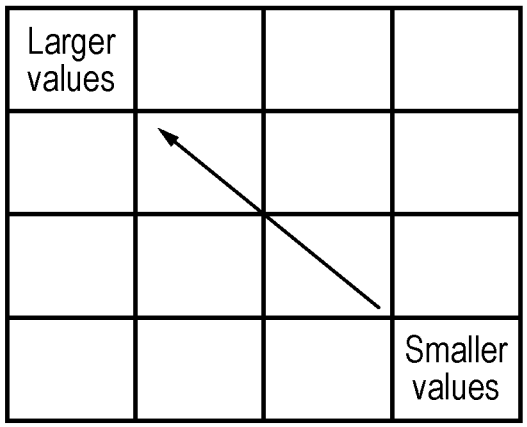
FIG. 17 schematically illustrates a trend within the array of FIG. 16.
Figure 18:
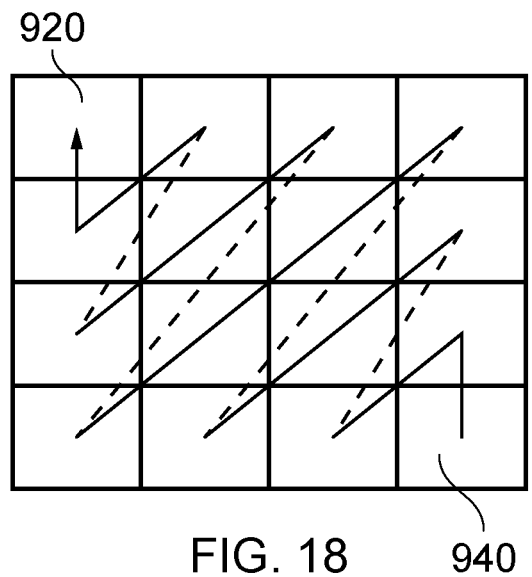
FIG. 18 schematically illustrates a reverse scan.

In general terms, this trend of importance can also correspond to a trend in terms of coefficient magnitude, in that the magnitude of the DC coefficient can tend to be the largest within the set of coefficients derived from a block of samples. FIG. 17 schematically illustrates such a trend within the array of FIG. 16, in which smaller values tend to be towards the lower right of the array and larger values tend to be towards the upper left of the array. Of course, a specific individual array of coefficients may differ from this general trend. One way in which the trends discussed above are technically relevant relates to the entropy encoding stage carried out by the entropy encoder 370 in FIG. 5. A general principle applied to this type of entropy encoding is that it operates more efficiently by dealing with smaller-magnitude data values within a block before dealing with larger-magnitude data values. Accordingly, in the case that frequency separated coefficients are subjected to entropy encoding (whether or not an intervening quantisation stage is used) a so-called "reverse scan" pattern is used to select data in an appropriate order for entropy encoding. FIG. 18 schematically illustrates an example of a reverse scan. This example relates to a so-called reverse-diagonal scan which starts with the coefficient 940 in the lower-right corner of the array of coefficients and progresses up to the DC coefficient 920 according to the diagonal scanning pattern shown. This pattern means that, generally speaking, smaller value coefficients are encoded before larger value coefficients.

The trend in importance also relates to the scaling list values, and indeed this is one purpose of the scaling list, to allow for different quantisation to be applied at different coefficient positions within an array. In general terms, as shown schematically in FIG. 19, scaling list values (one value or entry for each array position in the video data to be quantised or dequantised) tend to be smallest at the array position corresponding to the DC coefficient, and tends to get larger with increasing horizontal and vertical spatial frequency. Note that a smaller scaling list value corresponds to a less-harsh quantisation.

Figure 20:
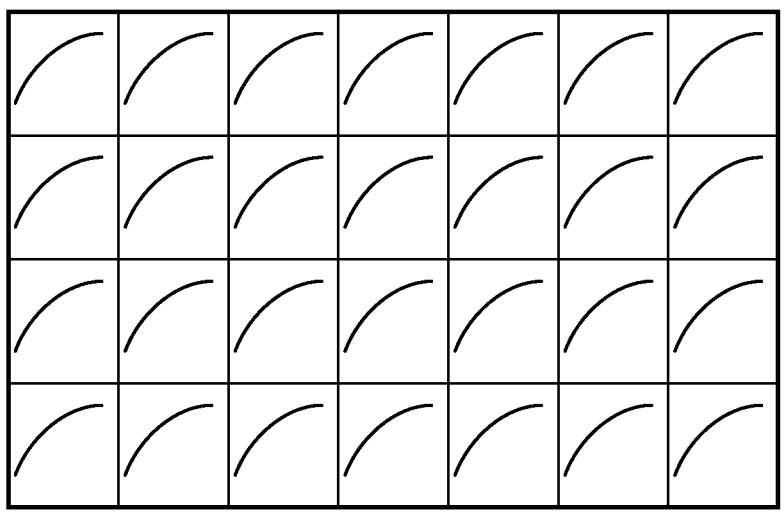
FIG. 20 schematically illustrates an image aberration.

These techniques can operate successfully in respect of frequency-transformed data. However, if a frequency-transform is not used, for example in a so-called "transform-skip" mode (in which, as the name suggests, frequency transformation is not employed) then the data within an array of values to be quantised will not exhibit the trends in either importance or numerical value discussed above, and nor will any variation in the harshness of quantisation be smoothed out across the reconstructed image data by an inverse transform process. Instead, the scaling lists simply cause a periodic pattern of variable quantisation to be imposed on the image. In a transform-skip block, less harsh quantisation will be applied to the upper left portion and more harsh quantisation will be applied to the lower right portion, but in terms of the reconstructed image, all of the image positions within the transform-skip block are equally significant and they all corresponds to respective image positions in the reconstructed image. So, as a schematic sample, FIG. 20 schematically shows a type of aberration which may be seen if scaling lists are used with data which has not been frequency transformed. Each block exhibits a higher image quality towards its upper left corner, leading to a "fish scale" effect as illustrated.

Various options are provided within the present embodiments to address this problem.

For example, in some embodiments, in a transform-skip mode, the use of scaling lists is inhibited or prevented so that the quantisation or dequantisation values are independent of the position of each data value within the array. For example, a decoder may comprise a detector (for example, implemented by the controller 345) configured to detect whether a transform-skip mode is applicable to the array of encoded video data values; in which: if the detector detects that the transform-skip mode is not applicable to the array of encoded video data values, the detector controls the dequantiser to apply dequantisation parameters which may vary between data values in the array of encoded data values according to the position of each data value within the array, and controls the inverse frequency transformer to apply an inverse frequency transform to the dequantised data values; and if the detector detects that the transform-skip mode is applicable to the array of encoded video data values, the detector controls the dequantiser to apply dequantisation parameters which, for each array of encoded data values, are independent of the position of each data value within the array, and controls the inverse frequency transformer not to apply an inverse frequency transform to the dequantised data values. On the encoder side, if the transform-skip mode is not applicable to the array of input video data values, the controller 345 controls the frequency transformer to apply the frequency transformation and controls the quantiser to apply quantisation parameters which may vary between data values in the array of frequency transformed input data values according to the position of each frequency transformed input data value within the array; and if the transform-skip mode is applicable to the array of encoded video data values, the controller 345 controls the frequency transformer not to apply the frequency transformation and controls the quantiser to quantise the input video data values by applying quantisation parameters which, for each array of input data values, are independent of the position of each input data value within the array.

In some embodiments, instead of using a scaling list representing different values corresponding to different coefficient positions, either a scaling list is used comprising all the same value (that is to say, each scaling list entry in the scaling list has the same numerical value) or a single value is provided in place of a scaling list, and that single value is used in place of the scaling list entry at the appropriate calculation for each coefficient. For example, such a single value (or similar) can be used in a transform-skip mode. As a potential modification of these embodiments, the single value (whether sent or stored as an individual value or as multiple instances of the same value in an equivalent of a scaling list) may be a different single value dependent upon, for example, array size or video channel.

An example of a scaling list comprising all the same, identical to one another, value is shown below:

| 16 | 16 | 16 | 16 |
|----|----|----|----|
| 16 | 16 | 16 | 16 |
| 16 | 16 | 16 | 16 |
| 16 | 16 | 16 | 16 |

Such a transform-skip mode scaling list may be selected from a set of two or more different transform-skip mode scaling lists (for example, by the controller 345) according to one or more encoding parameters of the encoded video data. Alternatively, the transform-skip mode scaling list may be provided in a data stream containing the array of encoded data values. Alternatively the controller may derive the value of the transform scaling list from one or more values of the scaling list which would be applicable for use in respect of that array of data values if the transform-skip mode were not selected, such as one or more values at respective preselected locations in that scaling list.

Figure 21:
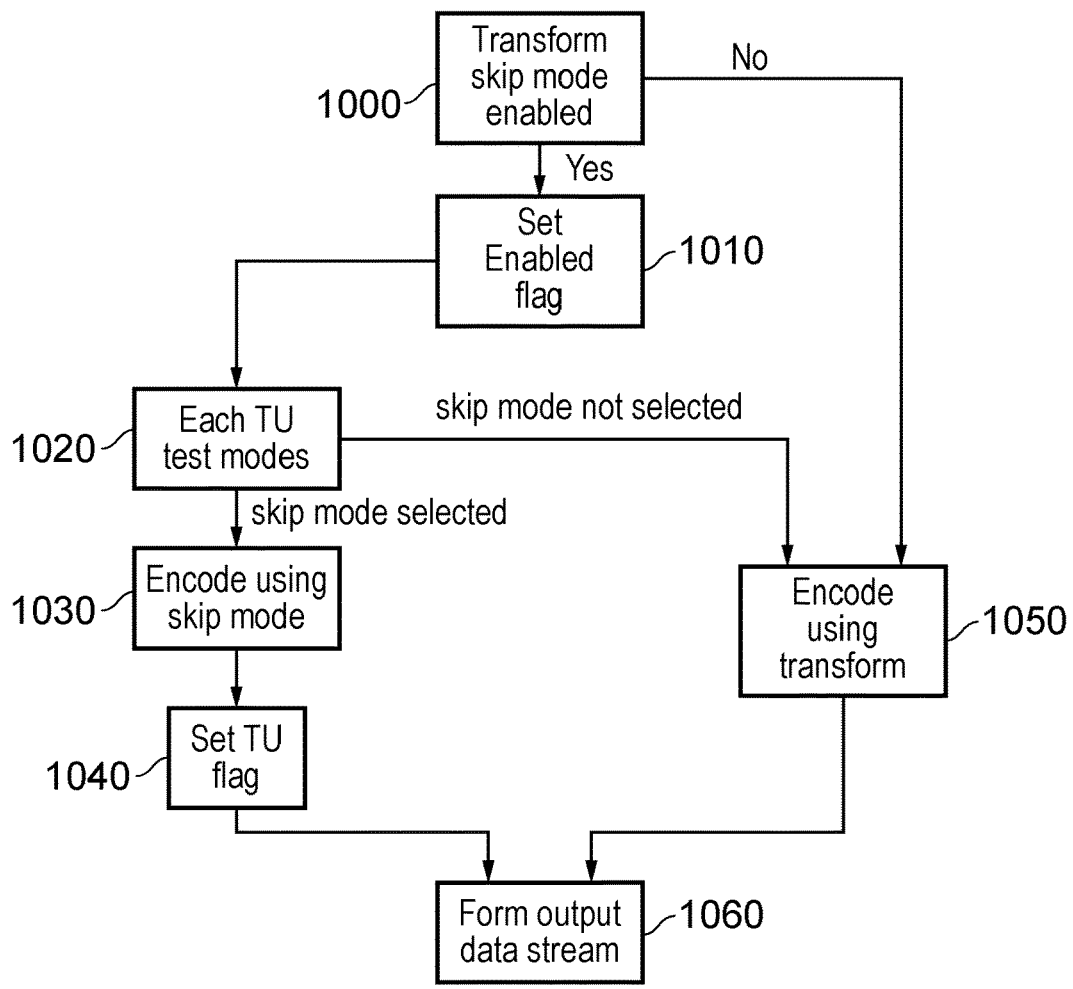
FIG. 21 is a schematic flowchart illustrating part of an encoding operation.
Figure 22:
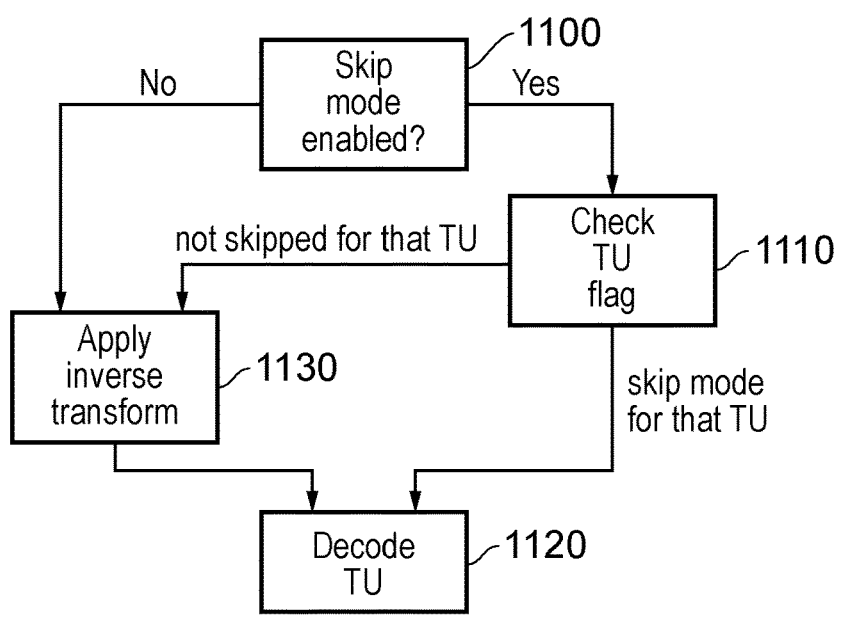
FIG. 22 is a schematic flowchart illustrating part of a decoding operation.

First, as background to the discussions which follow, FIG. 21 is a schematic flowchart illustrating part of an encoding operation, and FIG. 22 is a schematic flowchart illustrating a corresponding part of a decoding operation (features of which also apply to the reverse decoding path of an encoder).

Referring to FIG. 21, if, at a step 1000, a transform-skip mode is enabled (that is to say, such a mode is allowed within the context of the current encoding operation) then at a step 1010 a "transform-skip enabled" flag is associated with the video data stream. In one example, such a flag may be provided once per frame. If the transform-skip enabled flag is set, then the encoder will provide (and the decoder will look for) a TU-by-TU flag indicating whether transform-skip has been applied to that TU. If the transform-skip enabled flag is not set, then the encoder will not provide (and the decoder will not look for) the TU-by-TU flag.

Note that in some encoders, the transform-skip mode may be compulsory under the design parameters of that particular encoder. In other encoders, a detector (for example, implemented by the controller 345) may be configured to detect whether a transform-skip mode is applicable to a current array of input video data values.

At a step 1020, the controller 345 determines, for each TU, whether or not to use transform-skip. In some examples, this can be by testing the transform-skip mode and other modes using transforms, and selecting a mode in dependence upon an assessment of a cost function, which may relate to one or more of the data quantity generated in respect of that mode and the data errors generated in respect of that mode. If the transform-skip mode is selected then control passes to a step 1030 at which the TU is encoded using the transform-skip mode, and then to a step 1040 at which the TU-by-TU flag discussed above is set to indicate that the transform-skip mode has been used.

On the other hand, if at the step 1000 the transform-skip mode is not enabled, or if at the step 1020 the transform-skip mode is not selected for a particular TU, then encoding of a TU takes place at a step 1050 using a frequency transform.

Both the steps 1040 and 1050 pass control to a final step 1060 at which the output data stream is formed using the encoded data and, if appropriate, the flags and/or the scaling list values and/or single values.

The corresponding decoder operations are schematically illustrated in FIG. 22. A step 1100 detects whether the transform-skip mode is enabled by examining the most recent instance of the transform-skip enabled flag. If the transform-skip mode is enabled, then at a step 1110 the TU-by-TU flag is checked for each TU. If the skip mode is selected for a particular TU then the TU is decoded at a step 1120 without the use of an inverse transform. If, however, either the skip mode is not selected for a TU, or (at the step 1100) the skip mode is not enabled, then an inverse transformation is applied at a step 1130 before control is passed to the step 1120.

Figure 23:
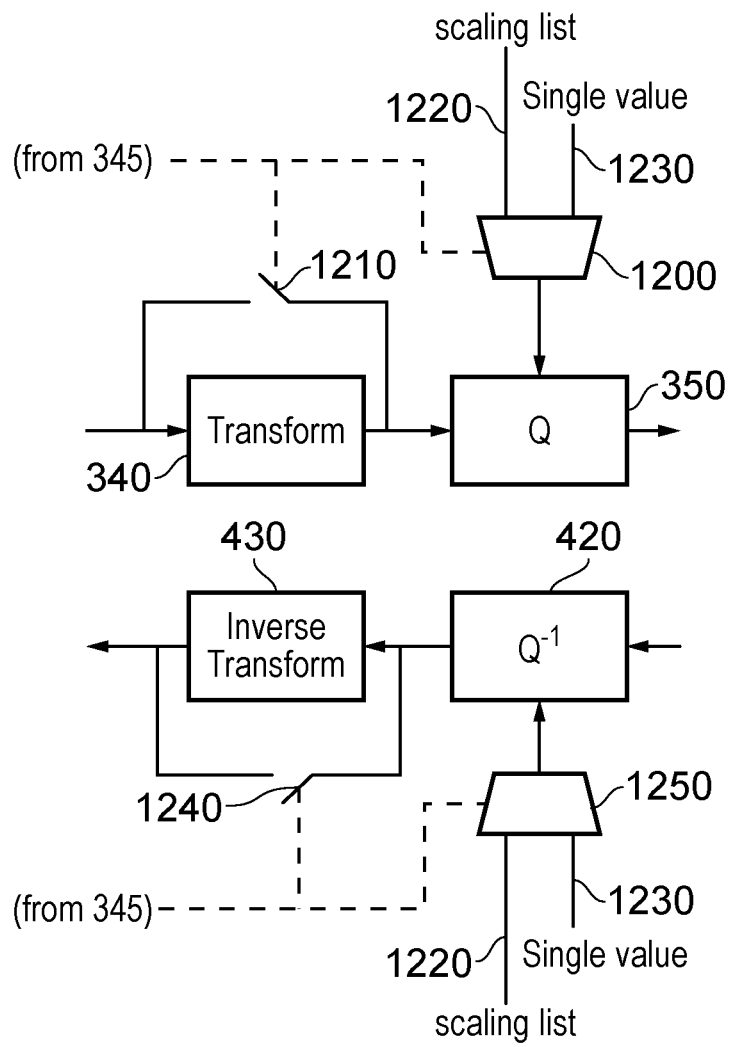
FIG. 23 schematically illustrates a part of an encoder and/or decoder.

FIG. 23 schematically illustrates a part of an encoder and/or decoder, in a similar way to FIG. 14. Indeed, many of the parts are identical and will not be described further here.

A control signal, for example from the controller 345, is provided to a multiplexer 1200 and a schematic switch 1210. The control signal indicates whether transform-skip mode is applicable to the current TU.

If transform-skip mode is applicable, then the schematic switch 1210 is closed so as to route data around the transform unit 340 or, in other words, to prevent the transform unit 340 from applying a frequency transform to the current block of data. Similarly, the multiplexer 1200 is controlled so that instead of a scaling list 1220, a single data value applicable to all data array positions is provided or substituted to the quantiser 350 for use in place of the scaling list. Accordingly, use of the scaling list is inhibited.

The single data value may be provided in a data stream containing the array of encoded data values. Alternatively, the controller 345 may derive the single data value from one or more values of the scaling list which would be applicable for use in respect of that array of encoded video data values if the transform-skip mode were not selected. Purely by way of example, the single value may be made equal to the scaling list value applicable to the top left (DC) array value, or may be an average such as a mean of the top left four scaling list values. Alternatively the single data value may be selected from a set of two or more different single data values according to one or more encoding parameters of the encoded video data. For example, the single value may be selected in dependence on a block size such as a TU size.

On the other hand, if applicable to the TU, then the schematic switch 1210 is opened so that the transform unit 340 is enabled, and the multiplexer 1200 is controlled to pass the scaling list 1220 rather than the single value 1230.

Similarly, at the decoding path, a corresponding schematic switch 1240 controls operation or bypass of the inverse transform unit 430, again under the control of a control signal from the controller 345. Another schematic multiplexer 1250 is provided so as to pass either a scaling list 1220 or a single value 1230 applicable to the current TU to the inverse quantiser 420. As before, in a transform-skip mode, the inverse transform unit 430 is not used and the single value 1230 is passed to the inverse quantiser 420. In a non-transform-skip mode, the scaling list 1220 is used and the inverse transform unit 430 is enabled.

Figure 24:
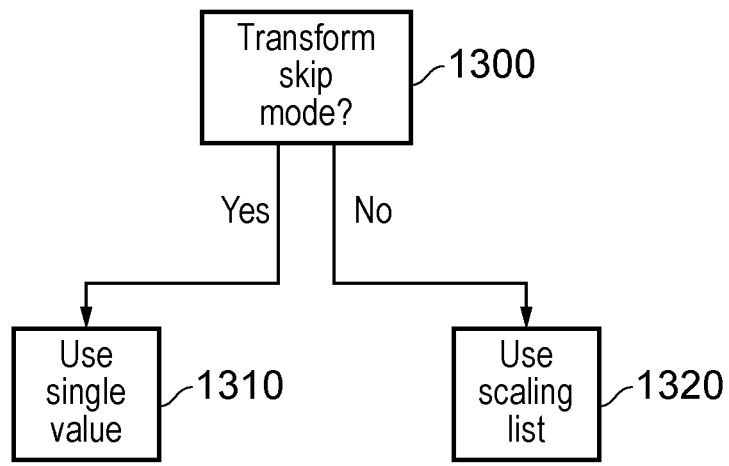
FIG. 24 is a schematic flowchart illustrating a part of an encoding and/or decoding operation.

These operations are summarised by a schematic flowchart of FIG. 24. If, at a step 1300, a transform-skip mode is applicable, then at a step 1310 a single value is used in place of the scaling list for that TU. On the other hand, if at the step 1300 the transform-skip mode is not applicable, then at a step 1320 a scaling list is used.

Figure 25:
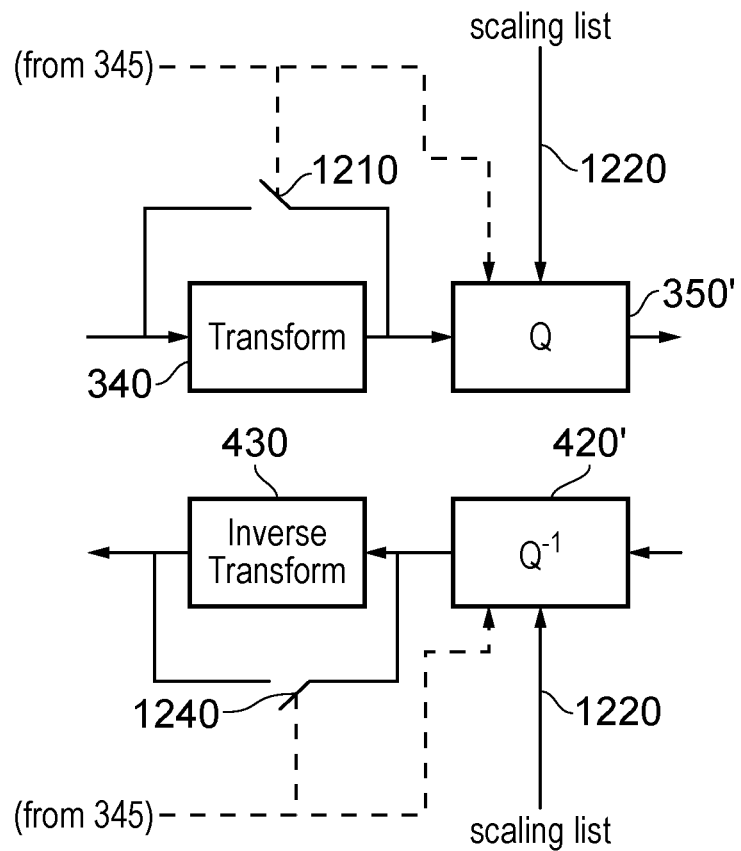
FIG. 25 schematically illustrates a part of an encoder and/or decoder.

A similar arrangement is shown in FIG. 25 and corresponding features already described in respect of FIG. 23 will not be described again. A difference between FIG. 25 and FIG. 23 is that the control signal from the controller 345 controls a modified quantiser 350' and inverse quantiser 420' either to use the scaling list 1220 (in a non-transform-skip mode) or not to use the scaling list (in a transform-skip mode), so that the use of scaling lists is thereby inhibited. Here, not using the scaling list means simply implementing the calculations discussed above in order to carry out quantisation, but without the contribution to (that is to say, the variation of, sample to sample) the calculations made by the scaling list variable. The term "not using the scaling list" in the previous sentence can of course encompass using a single value in place of the scaling list as discussed above.

Figure 26:
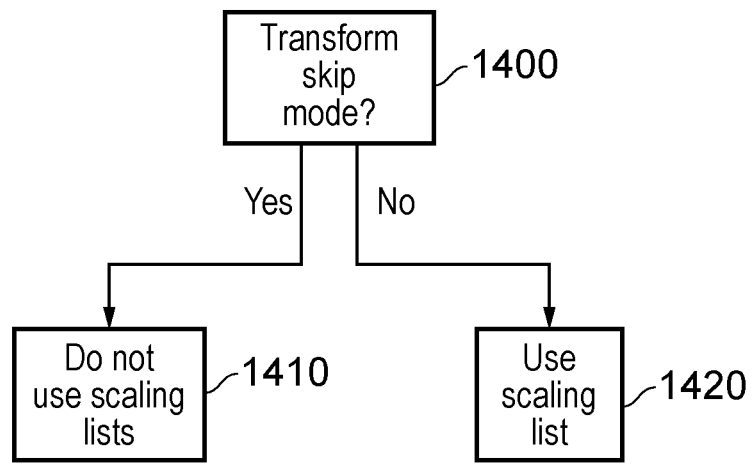
FIG. 26 is a schematic flowchart illustrating a part of an encoding and/or decoding operation.

This operation is summarised in the schematic flowchart of FIG. 26. If, at a step 1400, a transform-skip mode is applicable, then at a step 1410 a scaling list is not used for that TU. On the other hand, if at the step 1400 the transform-skip mode is not applicable, then at a step 1420 a scaling list is used.

It will be understood that although in the above discussions, the transform-skip mode is selected on a TU-by-TU basis, the selection can be made in respect of larger blocks such as CUs or even slices or images.

Data Signals

It will be appreciated that data signals generated by the variants of coding apparatus discussed above, and storage or transmission media carrying such signals, are considered to represent embodiments of the present disclosure.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure.

It will be apparent that numerous modifications and variations of the present disclosure are possible in light of the above teachings. It is therefore to be understood that within the scope of the appended claims, the technology may be practiced otherwise than as specifically described herein.

Further respective features of the present disclosure are defined by the following numbered clauses:

1. Video data decoding apparatus operable to decode an array of encoded video data values, the apparatus comprising:

a dequantiser configured to dequantise the array of encoded video data values by applying a dequantisation parameter to each data value so as to generate corresponding dequantised data values;

an inverse frequency transformer configured to apply an inverse frequency transform to the dequantised data values; and a detector configured to detect whether a transform-skip mode is applicable to the array of encoded video data values; in which:

if the detector detects that the transform-skip mode is not applicable to the array of encoded video data values, the detector controls the dequantiser to apply dequantisation parameters which may vary between data values in the array of encoded data values according to the position of each data value within the array, and controls the inverse frequency transformer to apply an inverse frequency transform to the dequantised data values; and if the detector detects that the transform-skip mode is applicable to the array of encoded video data values, the detector controls the dequantiser to apply dequantisation parameters which, for each array of encoded data values, are independent of the position of each data value within the array, and controls the inverse frequency transformer not to apply an inverse frequency transform to the dequantised data values.

2. Apparatus according to clause 1, in which the dequantiser is configured to use dequantisation parameters dependent upon respective entries in a scaling list, there being one entry in the scaling list for each array position of the encoded video data.

3. Apparatus according to clause 1 or clause 2, in which the detector is operable to inhibit use, by the dequantiser, of the scaling list in the case that the detector detects that that the transform-skip mode is applicable to the array of encoded video data values.

4. Apparatus according to clause 2, in which the dequantiser is configured to use a transform-skip mode scaling list in which all scaling list values are identical to one another in the case that the detector detects that that the transform-skip mode is applicable to the array of encoded video data values.

5. Apparatus according to clause 4, in which the transform-skip mode scaling list is selected from a set of two or more different transform-skip mode scaling lists according to one or more encoding parameters of the encoded video data.

6. Apparatus according to clause 4, in which the transform-skip mode scaling list is provided in a data stream containing the array of encoded data values.

7. Apparatus according to clause 4, the decoding apparatus being operable to derive the transform-skip mode scaling list values from one or more values of the scaling list which would be applicable for use in respect of that array of encoded video data values if the transform-skip mode were not selected.

8. Apparatus according to clause 2, in which the dequantiser is configured to substitute a single data value in place of the scaling list values in the case that the detector detects that that the transform-skip mode is applicable to the array of encoded video data values.

9. Apparatus according to clause 8, in which the single data value is provided in a data stream containing the array of encoded data values.

10. Apparatus according to clause 8, the decoding apparatus being operable to derive the single data value from one or more values of the scaling list which would be applicable for use in respect of that array of encoded video data values if the transform-skip mode were not selected.

11. Apparatus according to clause 8, in which the single data value is selected from a set of two or more different single data values according to one or more encoding parameters of the encoded video data.

12. Apparatus according to any one of the preceding claims, in which the array of encoded data values is selected from the list consisting of:
 an 8×8 array;
 a 16×16 array; and
 a 32×32 array.

13. Video data encoding apparatus operable to encode an array of input video data values in a transform-skip mode and optionally a non transform-skip mode, the apparatus comprising:
 a frequency transformer configured to apply a frequency transform to the input video data values to generate an array of frequency transformed input data values;
 a quantiser configured to quantise the frequency transformed input data values by applying a quantisation parameter to each frequency transformed input data value so as to generate corresponding quantised data values; and
 a controller;
 if the transform-skip mode is not applicable to the array of input video data values, the controller controls the frequency transformer to apply the frequency transformation and controls the quantiser to apply quantisation parameters which may vary between data values in the array of frequency transformed input data values according to the position of each frequency transformed input data value within the array; and
 if the transform-skip mode is applicable to the array of encoded video data values, the controller controls the frequency transformer not to apply the frequency transformation and controls the quantiser to quantise the input video data values by applying quantisation parameters which, for each array of input data values, are independent of the position of each input data value within the array.

14. Apparatus according to clause 13, comprising a detector configured to detect whether a transform-skip mode is applicable to the array of input video data values.

15. Apparatus according to clause 13, in which the quantiser is configured to use quantisation parameters dependent upon respective entries in a scaling list, there being one entry in the scaling list for each array position of the data to be quantised.

16. Apparatus according to clause 15, in which the detector is operable to inhibit use, by the quantiser, of the scaling list in the case that the detector detects that that the transform-skip mode is applicable to the array of input video data values.

17. Apparatus according to clause 15, in which the quantiser is configured to use a transform-skip mode scaling list in which all scaling list values are identical to one another in the case that the detector detects that that the transform-skip mode is applicable to the array of input video data values.

18. Apparatus according to clause 17, in which the transform-skip mode scaling list is selected from a set of two or more different transform-skip mode scaling lists according to one or more encoding parameters of the input video data.

19. Apparatus according to clause 17, in which the transform-skip mode scaling list is provided in a data stream containing the array of encoded data values.

20. Apparatus according to clause 17, the encoding apparatus being operable to derive the transform-skip mode scaling list values from one or more values of the scaling list which would be applicable for use in respect of that array of input video data values if the transform-skip mode were not selected.

21. Apparatus according to clause 15, in which the quantiser is configured to substitute a single data value in place of the scaling list values in the case that the detector detects that that the transform-skip mode is applicable to the array of input video data values.

22. Apparatus according to clause 21, in which the single data value is provided in a data stream containing the array of encoded data values.

23. Apparatus according to clause 21, the encoding apparatus being operable to derive the single data value from one or more values of the scaling list which would be applicable for use in respect of that array of input video data if the transform-skip mode were not selected.

24. Apparatus according to clause 21, in which the single data value is selected from a set of two or more different single data values according to one or more encoding parameters of the input video data.

25. Apparatus according to any one of clauses 13 to 24, in which the array of frequency transformed input data values is selected from the list consisting of:
 an 8×8 array;
 a 16×16 array; and
 a 32×32 array.

26. Video data capture, storage, transmission and/or recording apparatus comprising apparatus according to any one of the preceding clauses.

27. A video data decoding method for decoding an array of encoded video data values, the method comprising:
 detecting whether a transform-skip mode is applicable to the array of encoded video data values;
 if it is detected that the transform-skip mode is not applicable to the array of encoded video data values, dequantising the array of encoded video data values by applying dequantisation parameters which may vary between data values in the array of encoded data values according to the position of each data value within the array, and applying an inverse frequency transform to the dequantised data values; and
 if it is detected that the transform-skip mode is applicable to the array of encoded video data values, dequantising the array of encoded video data values by applying dequantisation parameters which, for each array of encoded data values, are independent of the position of each data value within the array, and not applying an inverse frequency transform to the dequantised data values.

28. A video data encoding method for encoding an array of input video data values, the method comprising:
 if a transform-skip mode is not applicable to the array of input video data values, frequency transforming the input video data and quantising the resulting array of frequency transformed input video data values by applying quantisation parameters which may vary between data values in the array of frequency transformed input data values according to the position of each frequency transformed input data value within the array; and
 if a transform-skip mode is applicable to the array of encoded video data values, quantising the input video data values by applying quantisation parameters which, for each array of input data values, are independent of the position of each input data value within the array.

29. Computer software which, when executed by a computer, causes the computer to implement the method of clause 27 or clause 28.

30. A non-transitory machine-readable storage medium on which computer software according to clause 29 is stored.

The invention claimed is:

1. A video data decoding apparatus configured to decode an array of encoded video data values, the apparatus comprising:
a processor programmed to;
receive the array of encoded video data values;
detect the array of encoded video data values;
dequantize the array of encoded video data values by applying a dequantization parameter to each data value so as to generate corresponding dequantized data values;
apply an inverse frequency transform to the dequantized data values;
detect whether a transform-skip mode is applicable to the array of encoded video data values;
reconstruct the dequantized video data values into an image
upon a determination that the transform-skip mode is not applicable to the array of encoded video data values:
apply dequantization parameters, which are not constrained not to vary between data values in the array of encoded data values according to the position of each data value within the array, to each data value within the array of encoded data values, and apply an inverse frequency transform to the dequantized data values; and
upon a determination that the transform-skip mode is applicable to the array of encoded video data values:
when the array of encoded video data values is one of an 8×8 array, a 16×16 array, and a 32×32 array; apply dequantization parameters, which are independent of the position of each data value within the array, to each data value within the array of encoded data values, and not apply an inverse frequency transform to the dequantized data values, and
when the array of encoded video data values is not one of the 8×8 array, the 16×16 array, and the 32×32 array: apply dequantization parameters, which are not constrained not to vary between data values within the array according to the position of each data value within the array, to each data value within the array of encoded data values, and not apply an inverse frequency transform to the dequantized data values.

2. The apparatus according to claim 1, wherein the processor is programmed to use dequantization parameters dependent upon respective entries in a scaling list, there being one entry in the scaling list for each array position of the encoded video data.

3. The apparatus according to claim 2, wherein, for the one of the 8×8 array, the 16×16 array, and the 32×32 array, the processor is programmed to inhibit use of the scaling list upon the determination that the transform-skip mode is applicable to the array of encoded video data values.

4. The apparatus according to claim 2, wherein, for the one of the 8×8 array, the 16×16 array, and the 32×32 array, the processor is programmed to use a transform-skip mode scaling list in which all scaling list values are identical to one another upon the determination that the transform-skip mode is applicable to the array of encoded video data values.

5. The apparatus according to claim 2, wherein the processor is programmed to substitute a single data value in place of the scaling list values upon the determination that the transform-skip mode is applicable to the array of encoded video data values and the array of encoded video data values is the one of the 8×8 array, the 16×16 array, and the 32×32 array.

6. The apparatus according to claim 4, in which the scaling list values have a value of 16.

7. A video data encoding apparatus configured to encode an array of input video data values in a transform-skip mode and optionally a non transform-skip mode, the apparatus comprising:
a processor programmed to;
receive the input video data values;
detect the input video data values;
apply a frequency transform to the input video data values to generate an array of frequency transformed input data values;
quantize the frequency transformed input data values by applying a quantization parameter to each frequency transformed input data value so as to generate corresponding quantized data values for decoding by a decoder to reconstruct the quantized data values into an image;
upon a determination that the transform-skip mode is not applicable to the array of input video data values:
apply the frequency transformation and apply quantization parameters, which are not constrained not to vary between data values in the array of frequency transformed input data values according to the position of each frequency transformed input data value within the array, to each data value within the array of frequency transformed input data values; and
upon a determination that the transform-skip mode is applicable to the array of input data values:
when the array of input video data values is one of an 8×8 array, a 16×16 array, and a 32×32 array: not apply the frequency transformation and quantize the input video data values by applying quantization parameters, which are independent of the position of each input data value within the array, to each data value within the array of input data values, and
when the array of input video data values is not one of the 8×8 array, the 16×16 array, and the 32×32 array: not apply the frequency transformation and quantize the input video data values by applying quantization parameters, which are not constrained not to vary between data values in the array of input data values according to the position of each input data value within the array, to each data value within the array of input data values.

8. The apparatus according to claim 7, wherein the processor is programmed to detect whether the transform-skip mode is applicable to the array of input video data values.

9. The apparatus according to claim 7, wherein the processor is programmed to use quantization parameters dependent upon respective entries in a scaling list, there being one entry in the scaling list for each array position of the data to be quantized.

10. The apparatus according to claim 9, wherein, for the one of the 8×8 array, the 16×16 array, and the 32×32 array, the processor is programmed to inhibit use of the scaling list upon the determination that the transform-skip mode is applicable to the array of input video data values.

11. The apparatus according to claim 9, wherein, for the one of the 8×8 array, the 16×16 array, and the 32×32 array, processor is programmed to use a transform-skip mode scaling list in which all scaling list values are identical to one another upon the determination that the transform-skip mode is applicable to the array of input video data values.

12. The apparatus according to claim 11, wherein the transform-skip mode scaling list is selected from a set of two or more different transform-skip mode scaling lists according to one or more encoding parameters of the input video data.

13. The apparatus according to claim 11, the processor is programmed to derive the transform-skip mode scaling list values from one or more values of the scaling list which would be applicable for use in respect of the array of input video data values if the transform-skip mode were not applicable.

14. The apparatus according to claim 9, wherein the processor is programmed to substitute a single data value in place of the scaling list values upon the determination that the transform-skip mode is applicable to the array of input video data values and the array of input video data values is the one of the 8×8 array, the 16×16 array, and the 32×32 array.

15. The apparatus according to claim 14, wherein the processor is programmed to derive the single data value from one or more values of the scaling list which would be applicable for use in respect of the array of input video data if the transform-skip mode were not applicable.

16. The apparatus according to claim 11, in which the scaling list values have a value of 16.

17. The apparatus according to claim 1, further configured to perform video data capture, storage, transmission, and/or recording.

18. A video data decoding method for decoding an array of encoded video data values, the method comprising:
  receiving the array of encoded video data values;
  detecting the array of encoded video data values;
  detecting whether a transform-skip mode is applicable to the array of encoded video data values;
  upon a determination that the transform-skip mode is not applicable to the array of encoded video data values:
    dequantizing the array of encoded video data values by applying dequantization parameters, which are not constrained not to vary between data values in the array of encoded data values according to the position of each data value within the array, to each data value within the array of encoded data values, and applying an inverse frequency transform to the dequantized data values;
  upon a determination that the transform-skip mode is applicable to the array of encoded video data values:
    when the array of encoded video data values is one of an 8×8 array, a 16×16 array, and a 32×32 array: dequantizing the array of encoded video data values by applying quantization parameters, which are independent of the position of each data value within the array, to each data value within the array of encoded data values, and not applying an inverse frequency transform to the dequantized data values, and
    when the array of encoded video data values is not one of the 8×8 array, the 16×16 array, and the 32×32 array: dequantizing the array of encoded video data values by applying dequantization parameters, which are not constrained not to vary between data values within the array according to the position of each data value within the array, to each data value within the array of encoded data values, and not apply an inverse frequency transform to the dequantized data values; and
  reconstruct the dequantized data values into an image.

19. A video data encoding method for encoding an array of input video data values, the method comprising:
  receiving the array of input video data values;
  detecting the array of input video data values;
  upon a determination that a transform-skip mode is not applicable to the array of input video data values:
    frequency transforming the input video data and quantizing the resulting array of frequency transformed input video data values by applying quantization parameters, which are not constrained not to vary between data values in the array of frequency transformed input data values according to the position of each frequency transformed input data value within the array, to each data value within the array of frequency transformed input data values;
  upon a determination that the transform-skip mode is applicable to the array of input video data values:
    when the array of input video data values is one of an 8×8 array, a 16×16 array, and a 32×32 array: not frequency transforming the input video data and quantizing the input video data values by applying quantization parameters, which are independent of the position of each input data value within the array, to each data value within the array of input data values, and
    when the array of input video data values is not one of the 8×8 array, the 16×16 array, and the 32×32 array: not frequency transforming the input video data and quantizing the input video data values by applying quantization parameters, which are not constrained not to vary between data values in the array of input data values according to the position of each input data value within the array, to each data value within the array of input data values; and
  providing the quantized input video data values for decoding by a decoder to reconstruct the quantized data values into an image.

20. A non-transitory machine-readable storage medium on which is stored computer readable instructions which, when executed by a computer, causes the computer to implement the method of claim 18.

21. A non-transitory machine-readable storage medium on which is stored computer readable instructions which, when executed by a computer, causes the computer to implement the method of claim 19.

* * * * *